United States Patent [19]
Kawakami

[11] Patent Number: 5,903,124
[45] Date of Patent: May 11, 1999

[54] APPARATUS FOR POSITIONING MOVING BODY ALLOWING PRECISE POSITIONING OF MOVING BODY

[75] Inventor: Yuichi Kawakami, Itami, Japan

[73] Assignee: Minolta Co., Ltd, Osaka, Japan

[21] Appl. No.: 08/937,732

[22] Filed: Sep. 25, 1997

[30]     Foreign Application Priority Data

Sep. 30, 1996  [JP]  Japan ................................. 8-258763

[51] Int. Cl.$^6$ ................................................. B64C 13/18
[52] U.S. Cl. ................ 318/587; 318/568.11; 318/568.12
[58] Field of Search .................................... 318/466, 587, 318/568.12, 568.11; 395/95, 93; 382/1; 364/424.02, 424.029

[56]        References Cited

U.S. PATENT DOCUMENTS

| | | | |
|---|---|---|---|
| 5,369,347 | 11/1994 | Yoo | 318/568.12 |
| 5,440,216 | 8/1995 | Kim | 318/587 |
| 5,446,356 | 8/1995 | Kim | 318/587 |
| 5,545,960 | 8/1996 | Ishikawa | 318/587 |
| 5,646,494 | 7/1997 | Han | 318/587 |
| 5,652,489 | 7/1997 | Kawakami | 318/587 |

FOREIGN PATENT DOCUMENTS 61-170811  1/1986  Japan .
7-319542  12/1995  Japan .

*Primary Examiner*—William M. Shoop, Jr.
*Assistant Examiner*—Rita Leykin
*Attorney, Agent, or Firm*—McDermott, Will &Emery

[57]        ABSTRACT

When a running vehicle moves backward and a right back portion of the robot, which is one end of it touches a wall, the robot is rotated to the left until a left back portion of the robot touches the wall. The angle of rotation $\beta$ at this time is measured and the value $\beta/2$ is represented by $\alpha$. The robot is rotated to the right by the angle $\beta-\alpha$. Therefore, the robot is positioned perpendicular to the wall. Thereafter, the robot is moved backward until the back portion of the robot touches the wall. As a result, an apparatus for positioning the running robot relative to the wall is provided.

20 Claims, 25 Drawing Sheets

RUBBER SENSOR

SENSOR SWITCH

DISTORTION SENSOR

APPARATUS FOR POSITIONING MOVING BODY ALLOWING PRECISE POSITIONING OF MOVING BODY

BACKGROUND OF THE INVENTION

1. Field of the Invention

The present invention relates to a method and an apparatus for positioning a moving body. More specifically, the present invention relates to a method and an apparatus for positioning a moving body capable of determining attitude of the moving body with respect to an object, which apparatus is attached on the moving body.

2. Description of the Related Art

Conventionally, an autonomous running robot (one type of moving bodies) having left and right wheels driven independently has been known. When there is an obstacle such as a wall in the direction of movement of the autonomous running robot, control for U-turn operation is performed.

In a U-turn, when an obstacle is detected in the direction of movement, the autonomous running robot is rotated by 90° to the right (or to the left), the autonomous running robot is moved straight by a prescribed distance, thereafter, the autonomous running robot is again rotated by 90° to the right (or left), and thereafter the autonomous running robot is moved straight.

However, sometimes the direction of movement of the autonomous running robot possibly deviates from the desired direction after the U-turn. Such deviation in angle results in deviation between the expected running path and the actual running path of the autonomous running robot, degrading quality of work performed by the autonomous running robot.

SUMMARY OF THE INVENTION

Therefore, an object of the present invention is to provide an apparatus for positioning a moving body allowing precise positioning of a moving body with respect to an object.

Another object of the present invention is to provide an apparatus for positioning a moving body allowing prescribed movement of the moving body.

A still further object of the present invention is to provide an autonomous running vehicle which allows precise positioning of a moving body with respect to an object.

A still further object of the present invention is to provide a method of positioning a moving body allowing precise positioning of a moving body with respect to an object.

The above described objects of the present invention can be attained by the apparatus for positioning a moving body in accordance with the present invention which includes a sensor for detecting at which one of left and right sides of an end portion of the moving body touches an object, a driver for driving the moving body after the detection by the sensor that the end portion of the moving body touched an object at one of the left and right sides until the sensor detects that the end portion of the moving body touches the object at the other one of the left and right sides, a measurer for measuring amount of driving performed by the driver, and a determining unit for determining attitude of the moving body with respect to the object, based on the measured amount of driving.

The amount of driving after it is detected that the end portion of the moving body touched the object at one of the left and right sides until it touches the object at the other one of the left and right sides is measured, and the attitude of the moving body with respect to the object is determined based on the measured amount of driving. Therefore, the actual attitude of the moving body with respect to the object is determined based on the measured amount of driving. Therefore, the actual attitude of the moving body can be detected. As a result, an apparatus for positioning a moving body providing exact knowledge of the position of the moving body is provided.

Preferably, the apparatus for positioning the moving body further includes an adjusting unit for adjusting attitude of the moving body based on the result of determination by the determining unit.

According to another aspect, the method of positioning a moving body is for positioning a moving body which is freely movable and rotatable both in left and right directions and has at least one sensor for detecting touching with an object, the method including the step of, after touching with the object is detected by the sensor, moving the moving body in a direction in which the sensor is away from the object, the step of rotating the moving body to one of the left and right directions until touching with the object is detected by the sensor; the step of rotating the moving body in the other one of the left and right directions until touching with the object is again detected by the sensor and measuring the amount of rotation at that time; and based on the measured amount of rotation, determining the attitude of the moving body with respect to the object.

After touching with the object is detected by the sensor on the moving body, the moving body is moved such that the sensor is away from the object, the moving body is rotated to one of left and right directions until touching with the object is detected by the sensor, then the moving body is rotated to the other direction, and the number of rotation is measured. Based on the measured amount of rotation, attitude of the moving body is determined. As a result, a method of positioning a moving body capable of precise positioning of the moving body with respect to the object can be provided.

According to a still further object, an autonomous running vehicle autonomously running over a prescribed region including a wall surface includes sensors provided when the autonomous running vehicle is positioned near the wall surface, the attitude of the autonomous running vehicle is detected using driving of the rotating portion and detection output from the sensors indicating that the distance to the wall surface is constant, and therefore an autonomous running vehicle capable of precise positioning of the moving body with respect to the object is provided.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 13A to 3C show operation when the cleaning unit does not touch the wall when turned to the left, in the left rotation positioning.

DESCRIPTION OF THE PREFERRED EMBODIMENTS

Figure 1:
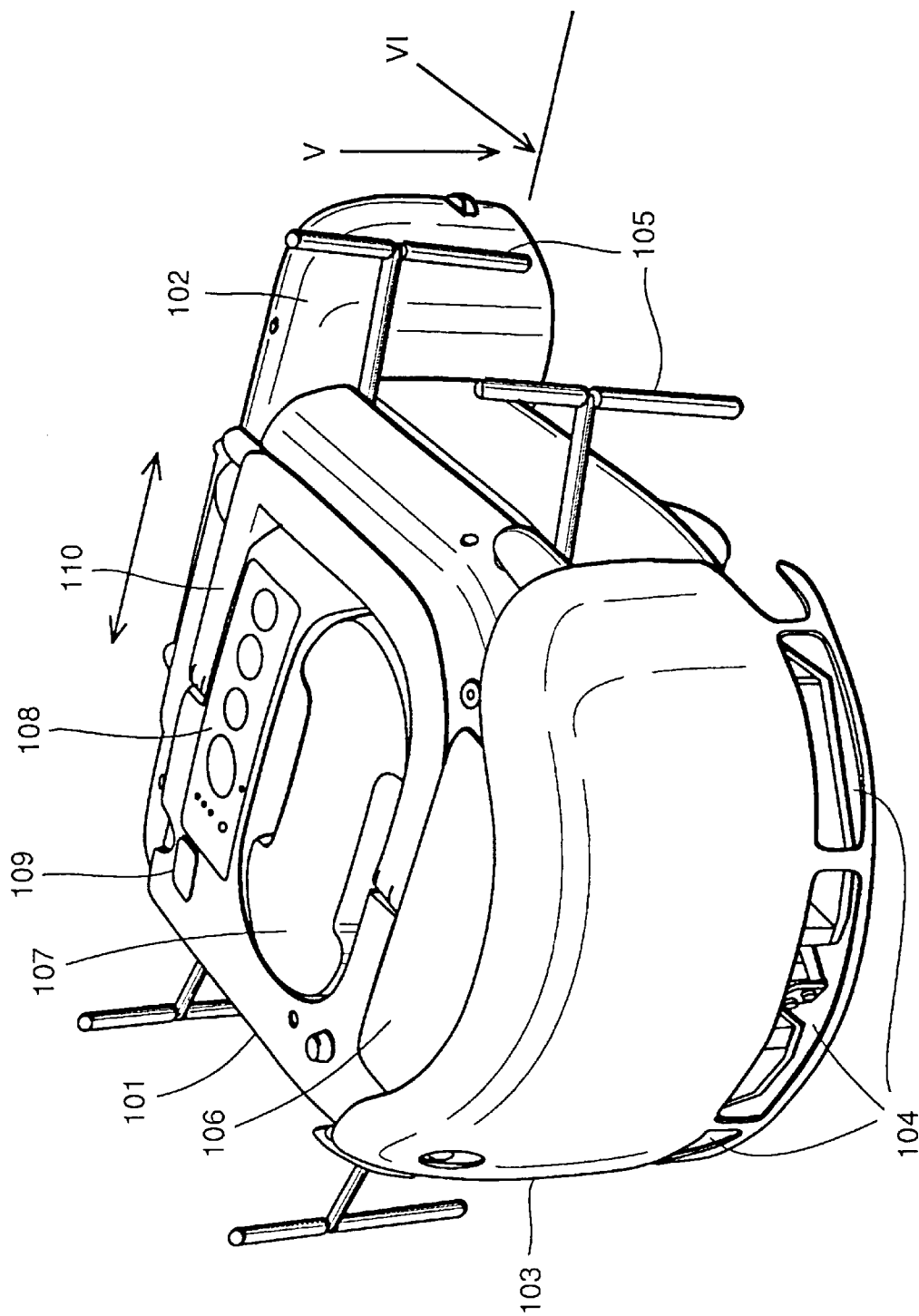
FIG. 1 is a perspective view of a running robot in accordance with a first embodiment of the present invention.

Referring to FIG. 1, the running robot employing the positioning apparatus in accordance with the first embodiment of the present invention includes a robot body 101, a cleaning unit 102, a bumper type sensor 103, a distance measuring window 104, a touch sensor 105, a battery 106, a liquid tank 107, an operation panel 108, a memory card inserting portion 109 and a handle 110.

Cleaning unit 102 attached to a rear portion of robot body 101 is slidable in left and right directions as denoted by the arrow. A rotary plate, not shown, is provided inside cleaning unit 102, and cleaning is performed by the rotation thereof.

Bumper type sensor 103 attached on a front face portion of robot body 101 is for detecting touching with an obstacle as the running robot runs. Distance measuring window 104 is provided at a lower portion of bumper type sensor 103, allowing a distance measuring sensor, not shown, mounted on the driving portion to measure distance.

Touch sensor 105 is for detecting touching with a wall surface when the running robot runs and it rotates in horizontal direction when it touches the wall surface, and the angle of rotation is detected. From respective angles of rotation of two touch sensors 105 provided at front and back portions, the angle and distance between the running robot and the wall surface are calculated, thereby enabling running of the robot following the wall surface.

Battery 106 supplies power consumed by the running robot. Since battery 106 is heavy, it is arranged at a front portion of the body to be balanced with the cleaning unit 102. More specifically, when the front portion is light and only the back portion is heavy of the running robot, torque by the driving wheel is not well transmitted to the ground, possibly resulting in slipping of the wheel. To prevent such problem, battery 106 is arranged at the front portion of the body.

Liquid tank 107 is for reserving liquid to be supplied to the rotary plate provided on the cleaning unit 102. Liquid tank 107 is detachable. Liquid is supplied by detaching liquid tank 107 and attaching it to its place.

Operation panel 108 includes switches and the like for operating the running robot. Detailed description of operation panel 108 is not given, as it is not much related to the present invention.

Memory card inserting portion 109 is for inserting a memory card in which working procedure of the running robot and so on are registered.

Handle 110 is used for carrying the running robot.

Figure 2:
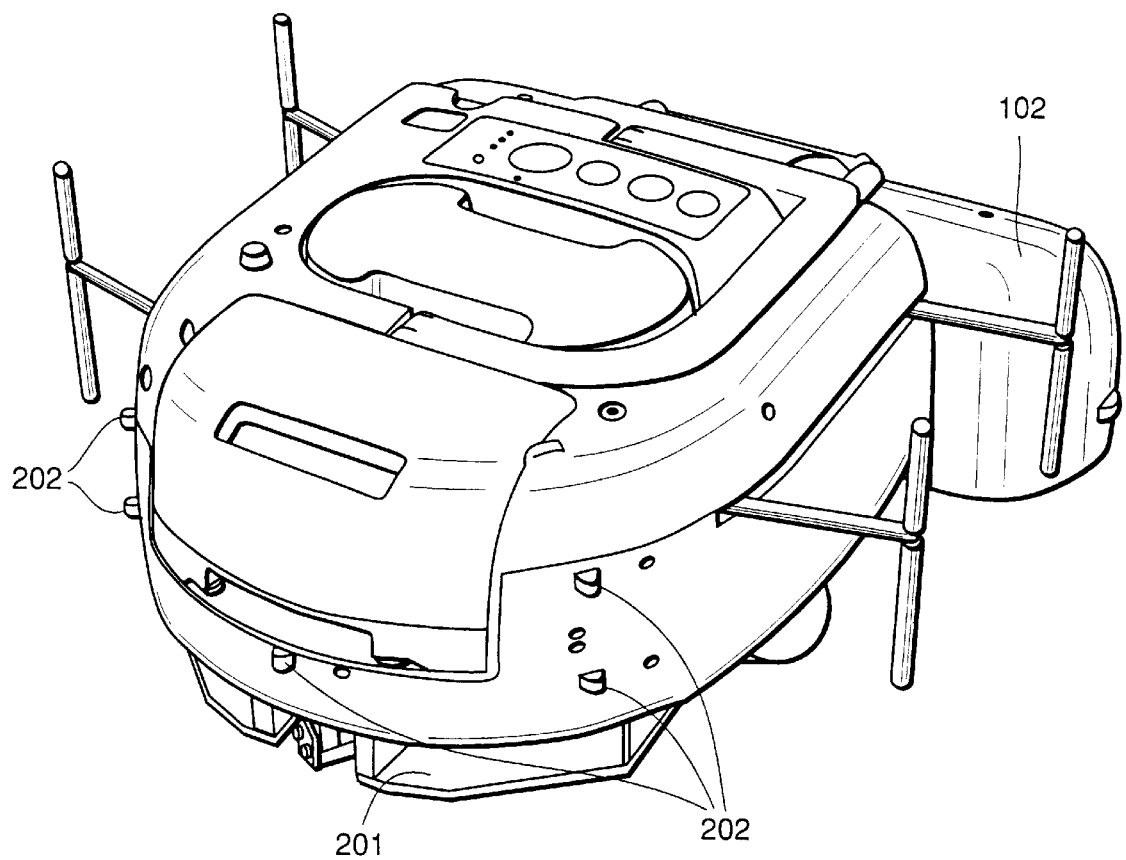
FIG. 2 is a perspective view of the running robot of FIG. 1 with a bumper type sensor removed.

FIG. 2 is a perspective view showing the running robot with bumper type sensor 103 provided on the front face shown in FIG. 1 removed.

Driving unit 201 is provided independently below robot body 101, and robot body 101 is adapted to be rotatable with respect to driving unit 201. Therefore, as the robot runs by means of driving unit 201 with robot body 101 rotated, running in any of forward, backward, left, right and diagonal directions with respect to robot body 101 is possible.

Switch 202 is for sensing touching with an obstacle. With bumper type sensor 103 attached, bumper type sensor 103 slides forward and backward with respect to the robot body. Therefore, when bumper type sensor 103 touches an obstacle while the running robot moves, bumper type sensor 103 moves backward, any of the switches 202 provided inside is pressed, and touching with the obstacle is sensed.

Figure 3:
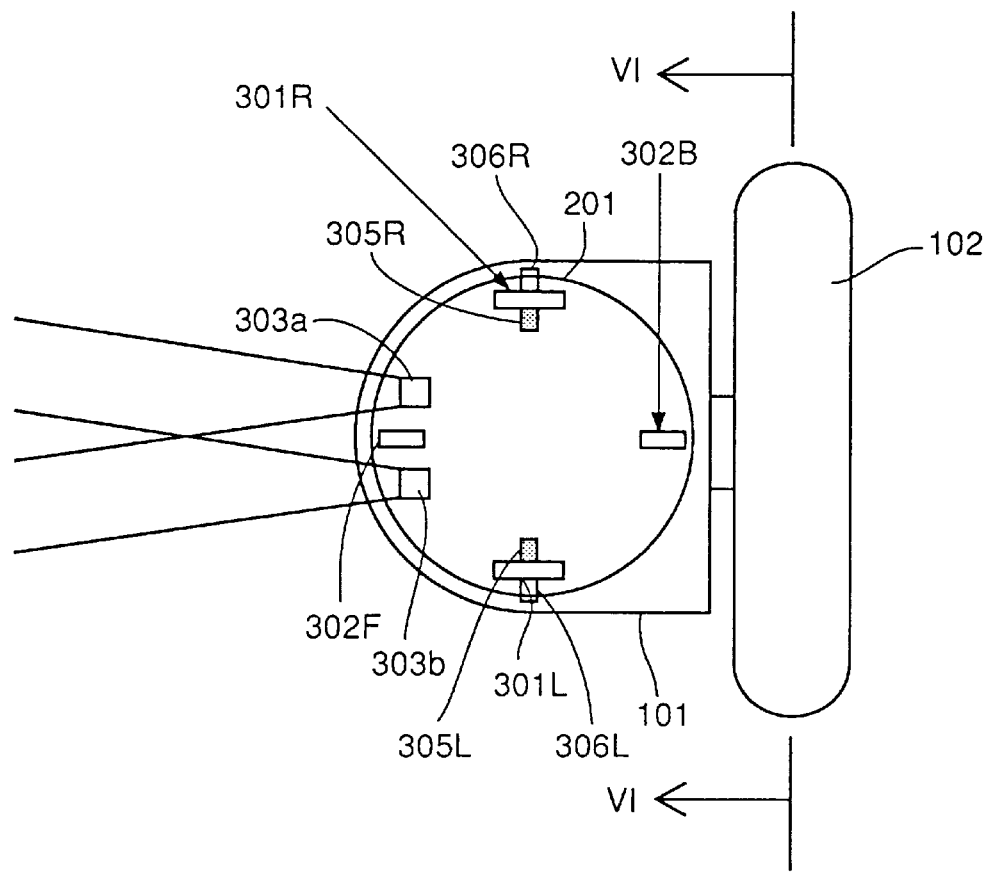
FIG. 3 is a plan view showing the structure of the running robot shown in FIG. 1.
Figure 4:
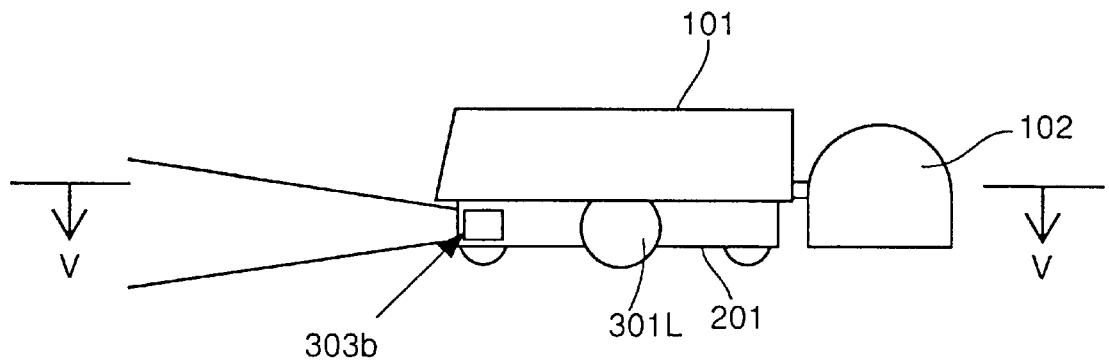
FIG. 4 is a side view of the running robot shown in FIG. 1.

FIG. 3 is a plan view showing the structure of driving unit 201 of the running robot shown in FIGS. 1 and 2, and FIG. 4 is a side view thereof.

Referring to the figures, driving unit 201 is attached rotatable relative to robot body 101. Driving unit 201 includes a right driving wheel 301R, a left driving wheel 301L, free casters 302F and 302B, distance measuring sensors 303a and 303b, a driving motor 305R connected to right driving wheel 301R, a driving motor 305L connected to left driving wheel 301L, an encoder 306R connected to right driving wheel 301R for measuring amount of rotation thereof, and encoder 306L connected to left driving wheel 301L for measuring the amount of rotation thereof.

Free caster 302F is attached rotatable in any direction in front of driving unit 201. Similarly, free caster 302B is provided behind driving unit 201.

In the running robot in accordance with the present embodiment, driving wheels 301R and 301L are controlled such that the wheels are driven independent from each other whereby the running robot can run. When left and right driving wheels 301R and 301L are driven in the same direction, the running robot moves forward or rearward. By increasing number of rotation of one of the driving wheels 301R and 301L, the running robot curves. By rotating driving wheels 301R and 301L at the same number of rotation in opposite directions, spin turning is possible.

By rotating one driving wheel while keeping the other driving wheel stopped, running robot rotates about the stopped driving wheel as an axis.

Distance measuring sensors 303a and 303b measure distance to the object, which may be formed of an ultrasonic sensor or an optical distance measuring sensor. Distance measuring sensors 303a and 303b are arranged facing forward with respect to the direction of movement, at a front portion of driving unit 201. Here, two distance measuring sensors 303a and 303b facing forward with respect to the direction of movement are arranged. However, forward distance may be measured by either one of these.

Figure 5:
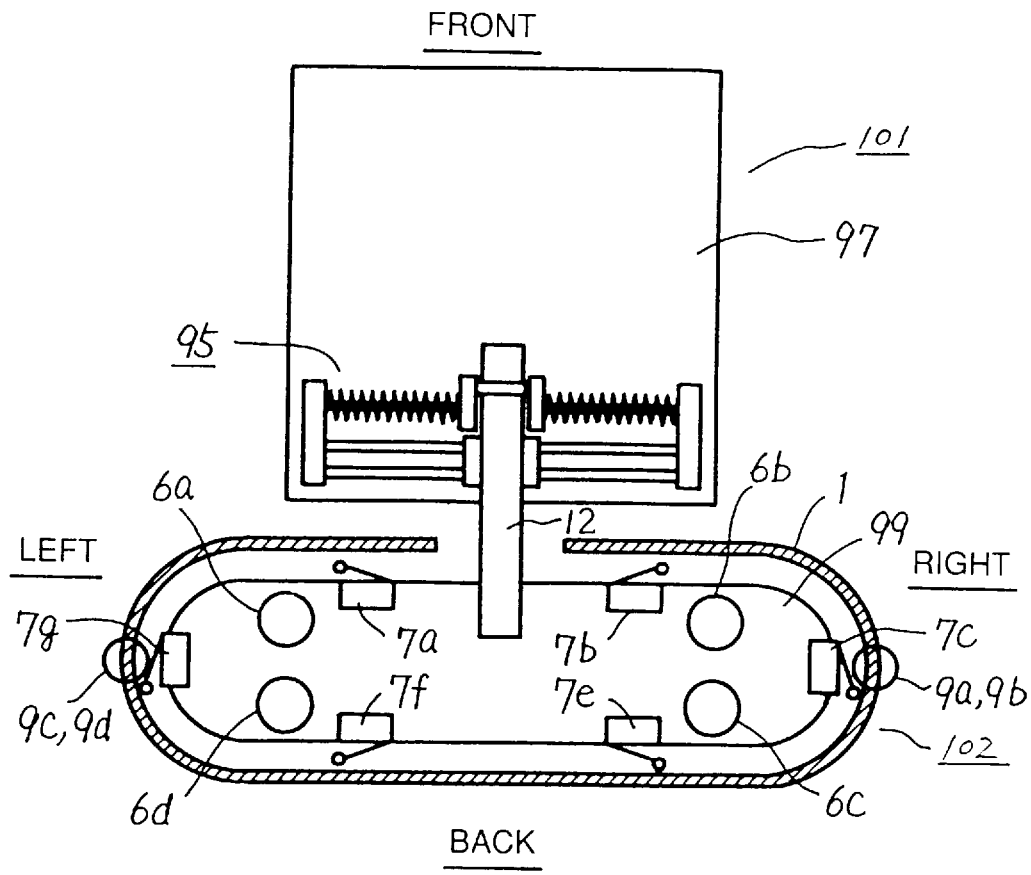
FIG. 5 is a plan view showing the structure of a cleaning unit.
Figure 6:
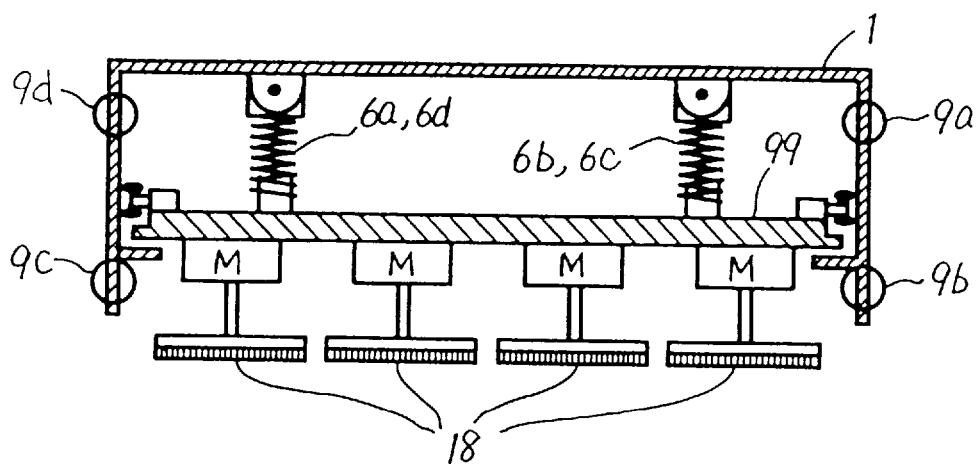
FIG. 6 is a cross section showing a structure of the cleaning unit.

FIG. 5 is a cross sectional view taken along the line V—V of FIG. 4 and FIG. 6 is a cross section taken along the line VI—VI of FIG. 3.

Referring to FIG. 5, a connecting portion 95 to cleaning unit 102 is attached on that side of robot body base 97 which is close to cleaning unit 102 of robot body 101. Cleaning unit 102 includes, as main components, a cleaning unit base plate 99 fixed to connecting member 12 protruding from connecting portion 95 of robot body 101, and a cleaning unit outer cover 1 covering and enclosing cleaning unit base plate 99. Cleaning unit outer cover 1 and unit base plate 99 are connected by four outer cover connecting members 6a to 6d.

Figure 7A:
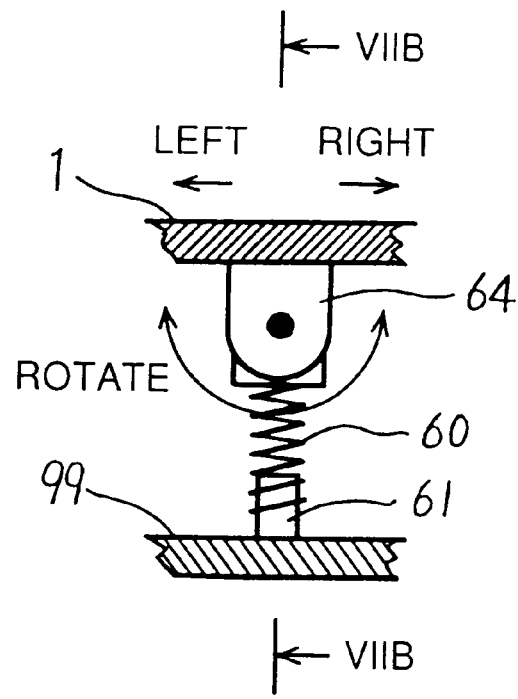
FIGS. 7A and 7B are illustrations showing the structure of an outer cover connecting member.
Figure 7B:
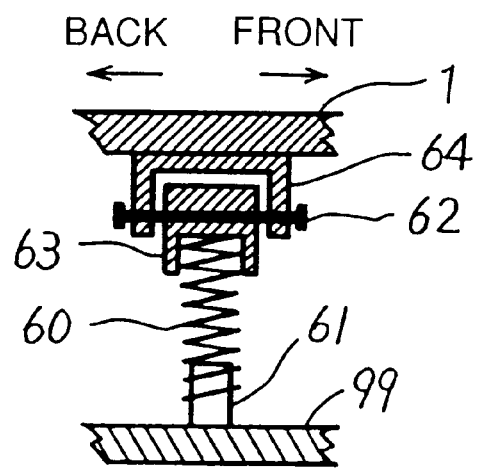

FIGS. 7A and 7B show, in greater detail, the structure of one of the outer cover connecting members 6a to 6d shown in FIGS. 5 and 6. More specifically, FIG. 7A is taken from the same direction as FIG. 6, and FIG. 7B is a cross section taken along the line VII B—VII B of FIG. 7A.

Figure 8A:
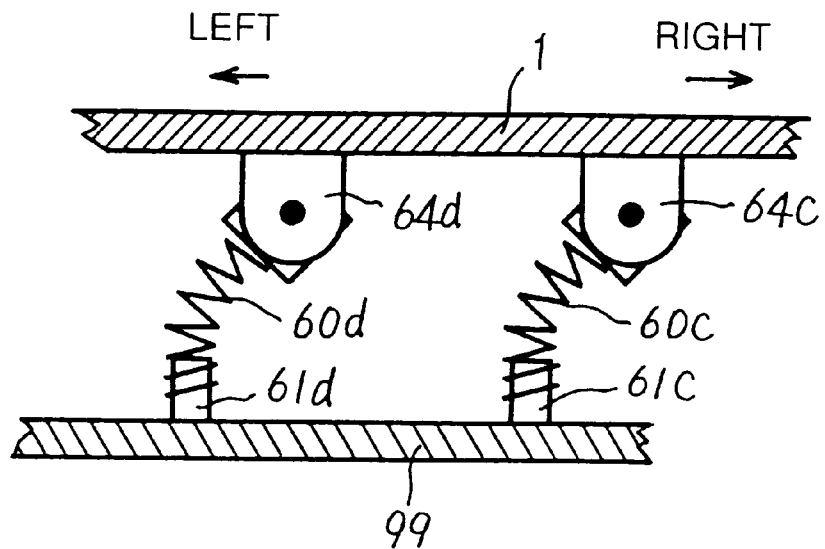
FIGS. 8A and 8B are illustrations showing the operation of the outer cover connecting member.
Figure 8B:
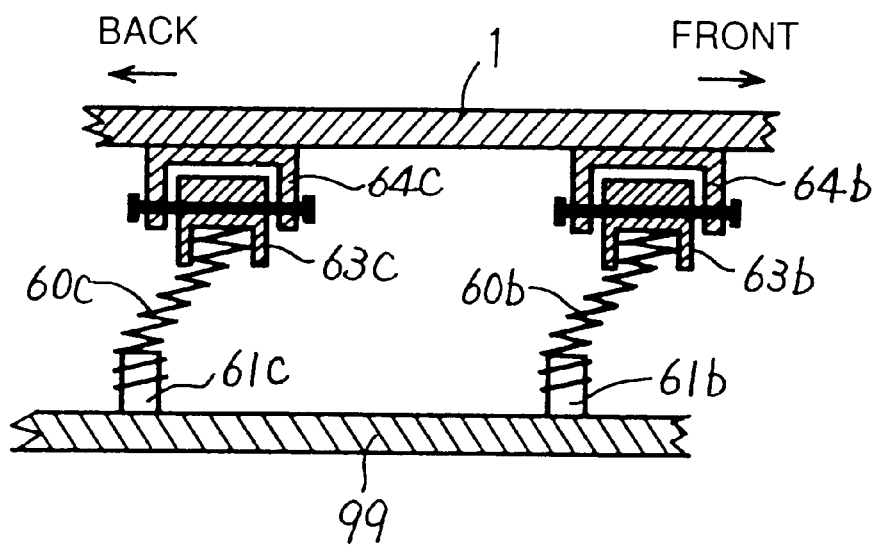

Referring to FIGS. 7A and 7B, one end of coil spring 60 is press fitted in a pole 61 erected on cleaning unit base plate 99, and the other end is press fitted in connecting member 63. Connecting member 63 is rotatably attached to a shaft 62 fixed at a ceiling surface of cleaning unit outer cover 1 by means of a shaft attaching member 64. Therefore, referring to FIG. 8A, coil spring 60 simply bents when force in left and right direction is applied to outer cover 1, while coil spring 60 bents in S-shape when a force in forward and backward directions is applied as shown in FIG. 8B. As a result, greater force is necessary in the forward and backward directions than in left and right directions to cause movement by the same amount.

Referring to FIGS. 5 and 6, cleaning unit base plate 99 includes microswitches 7a, 7b, 7c, 7e, 7f and 7g for detecting change in relative positional relation between cleaning unit outer cover 1 and cleaning unit base plate 99.

Referring to FIGS. 5 and 6, rotating bodies 9a to 9d are attached on left and right side surfaces of outer cover 1 and rotate about a vertical axis. More specifically, rotating bodies 9a to 9b rotate when the robot runs while it is in contact with an object such as a wall, and reduces friction force between outer cover 1 and the object such as the wall.

In cleaning unit 102, four rotary plates 18 for cleaning floor are directly coupled to and driven by motor M and rotate about vertical axis. A none-woven fabric for cleaning is exchangeably attached to the lower surface of each rotary plate.

Figure 9:
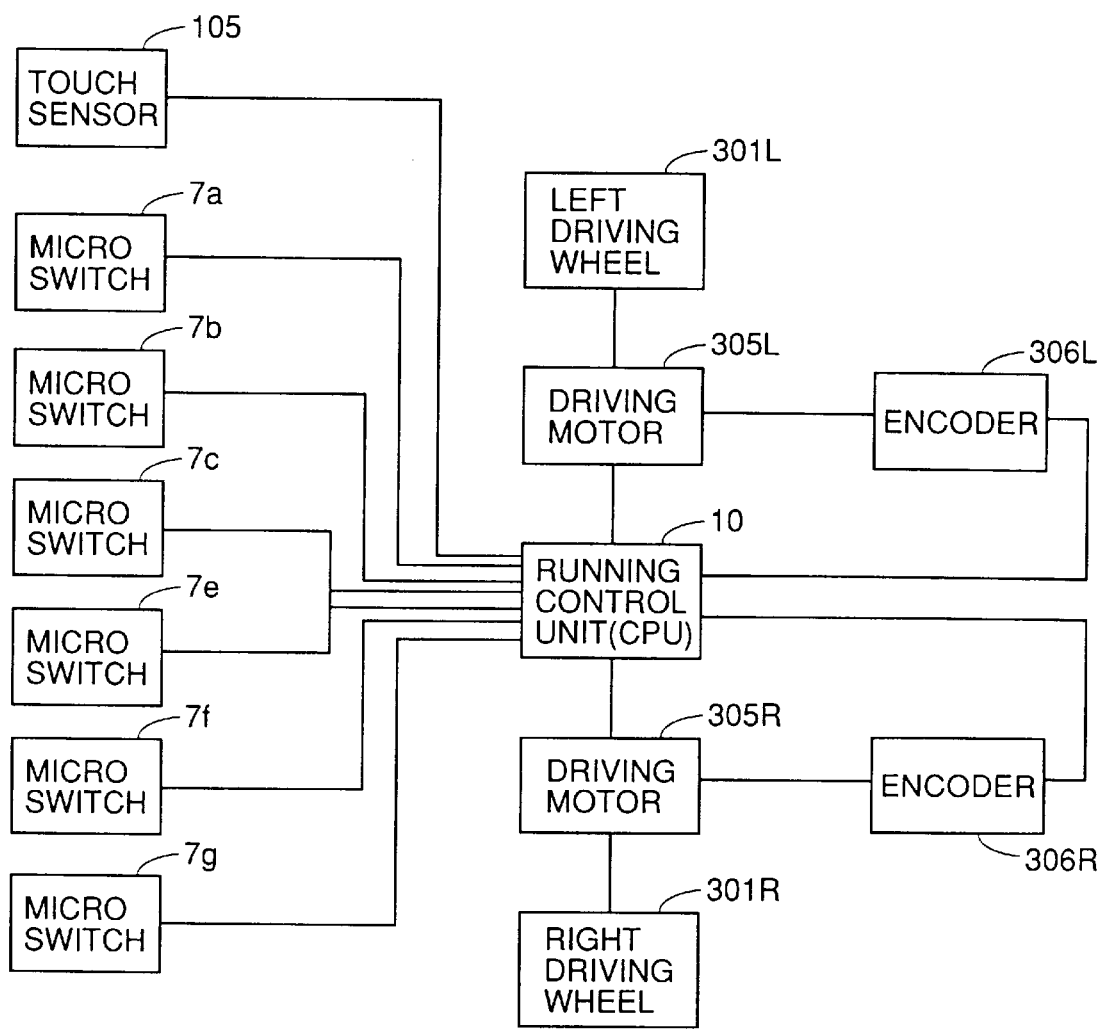
FIG. 9 is a block diagram showing a circuit structure of the running robot shown in FIG. 1.

FIG. 9 is a block diagram of a control circuit for the running robot shown in FIG. 1. Referring to the figure, running of the running robot is controlled mainly by a running control unit (CPU) 10. Running control unit 10 has a storage unit storing map of the area in which it runs and moving path in advance, and controls running based on the information. Rather than providing information of map and moving path with running control portion 10, running may be controlled by an instruction from an external remote controller.

Running control unit 10 controls numbers of rotation of driving wheel motors 305L and 305R based on the distance detected by touch sensor 105 from the wall which is the object to be followed, when the robot runs following an object. Numbers of rotation of motors 305L and 305R for driving wheels are determined by monitoring the outputs from encoders 306L and 306R. Encoder 306L measures number of rotation of motor 305L driving left driving wheel 301L, and outputs the measured result to running control unit 10.

Encoder 306R measures the number of rotation of motor 305R for driving right driving wheel 301R and outputs the result of measurement to running control unit 10.

When it is determined by touch sensor 105 that distance to the wall which is the object to be followed is longer than a reference distance, number of rotation of the wheel driving motor nearer to the wall is controlled such that the number becomes smaller than the number of rotation of the other motor. Thus the moving robot moves nearer to the wall.

When it is determined that the distance to the wall which is the object to be followed is shorter than the reference distance, number of rotation of the motor for driving wheel nearer to the wall is controlled so that it becomes larger than that of the other motor. Thus the running robot moves away from the wall.

When the robot is moved forward and either one of microswitches 7a and 7b provided in front of the cleaning unit base plate 99 turns on, running control unit 10 temporarily stops running of the robot, by stopping driving of motors 305L and 305R. Thereafter, running for avoiding the obstacle is performed. Meanwhile, when the robot is moved backward and either of the microswitches 7e and 7f provided behind cleaning unit base plate 99 turns on, running control unit 10 stops driving of motors 305L and 305R, so as to temporarily stop running of the robot. Thereafter, running for avoiding an obstacle is performed.

Further, by using microswitches 7c, 7e, 7f and 7g, it is possible to position the running robot relative to the wall.

Positioning is performed after a U-turn, for example, to determine direction of movement of the running robot so that the running robot moves perpendicular to the wall surface.

Figure 10:
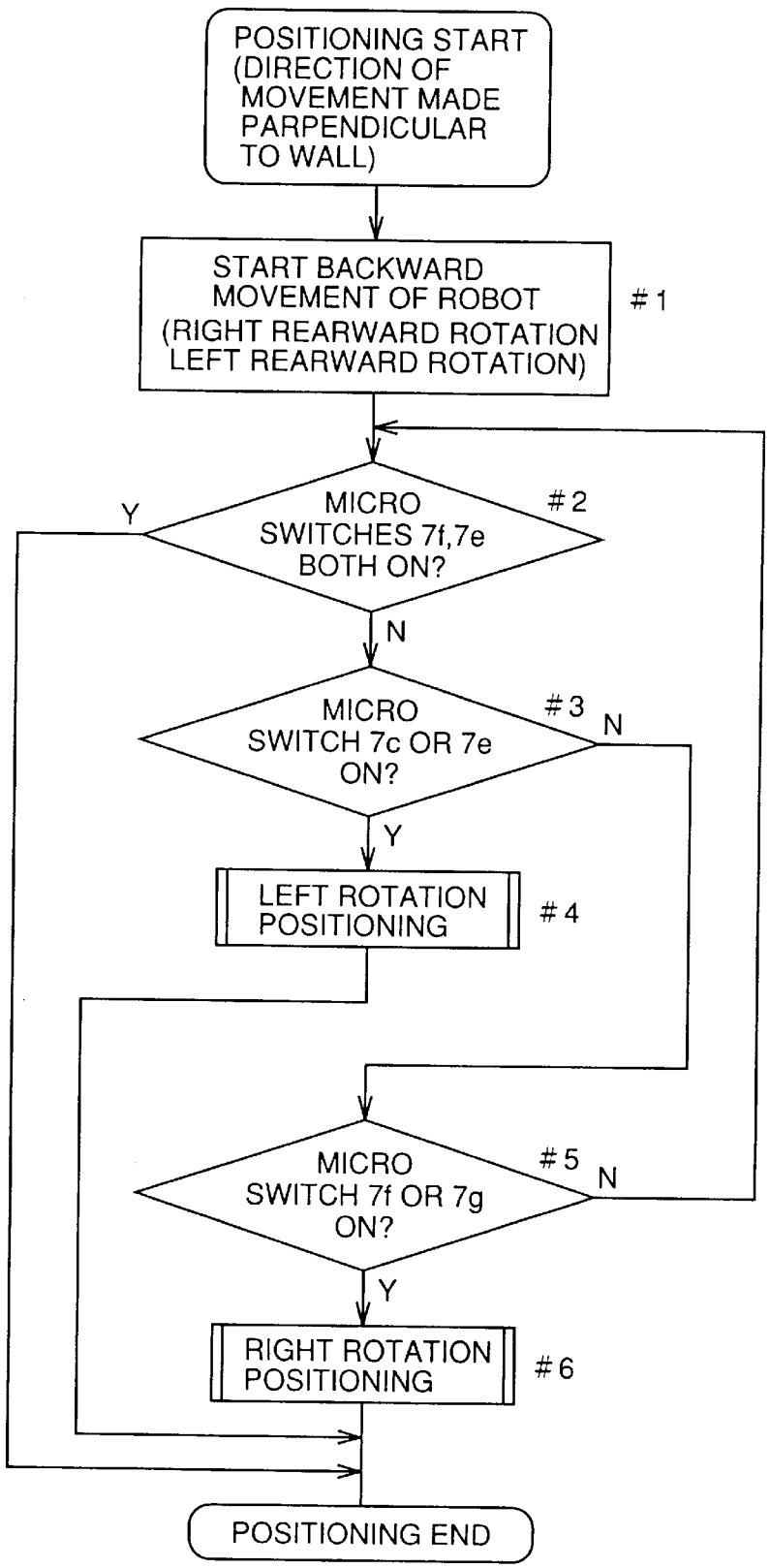
FIG. 10 is a main flow chart of positioning process.

FIG. 10 is a flow chart showing the process of positioning for moving the robot in a direction perpendicular to the wall.

The process represented by the flow chart is performed after the completion of a U-turn, for example.

Referring to the figure, in step #1, whether the running robot is to be moved forward or backward is determined. For moving the robot backward, both right and left driving wheels 301R and 301L are driven in the direction for moving the robot backward. In the following, this direction of rotation will be referred to as "rearward rotation" and the direction for moving the robot forward will be referred to as "forward rotation."

In step #2, whether or not microswitches 7f and 7e are both on as cleaning unit outer cover 1 touches the wall is determined. If it is NO in step #2, then in step #3, whether one of microswitches 7c and 7e is on is determined. If it is NO in step #3, in step #5, whether one of microswitches 7f and 7g is on is determined. If it is NO in step #5, the flow returns to step #2.

When it is YES in step #2, it means that the running robot is facing the direction perpendicular to the wall, and therefore positioning process is completed.

If it is YES in step #3, then left rotation positioning is performed in step #4.

Left rotation positioning refers to a process for determining deviation between the direction of movement of the running robot and the direction perpendicular to the wall by rotating the running robot to the left for adjusting the deviation. Details will be described later.

If it YES in step #5, then right rotation positioning is performed in step #6.

The right rotation positioning refers to a process for determining deviation between the direction of movement of the running robot and the direction perpendicular to the wall by rotating the running robot to the right for adjusting the deviation. Details will be described later.

When process in step #4 or #6 is completed, positioning is completed.

Figure 11:
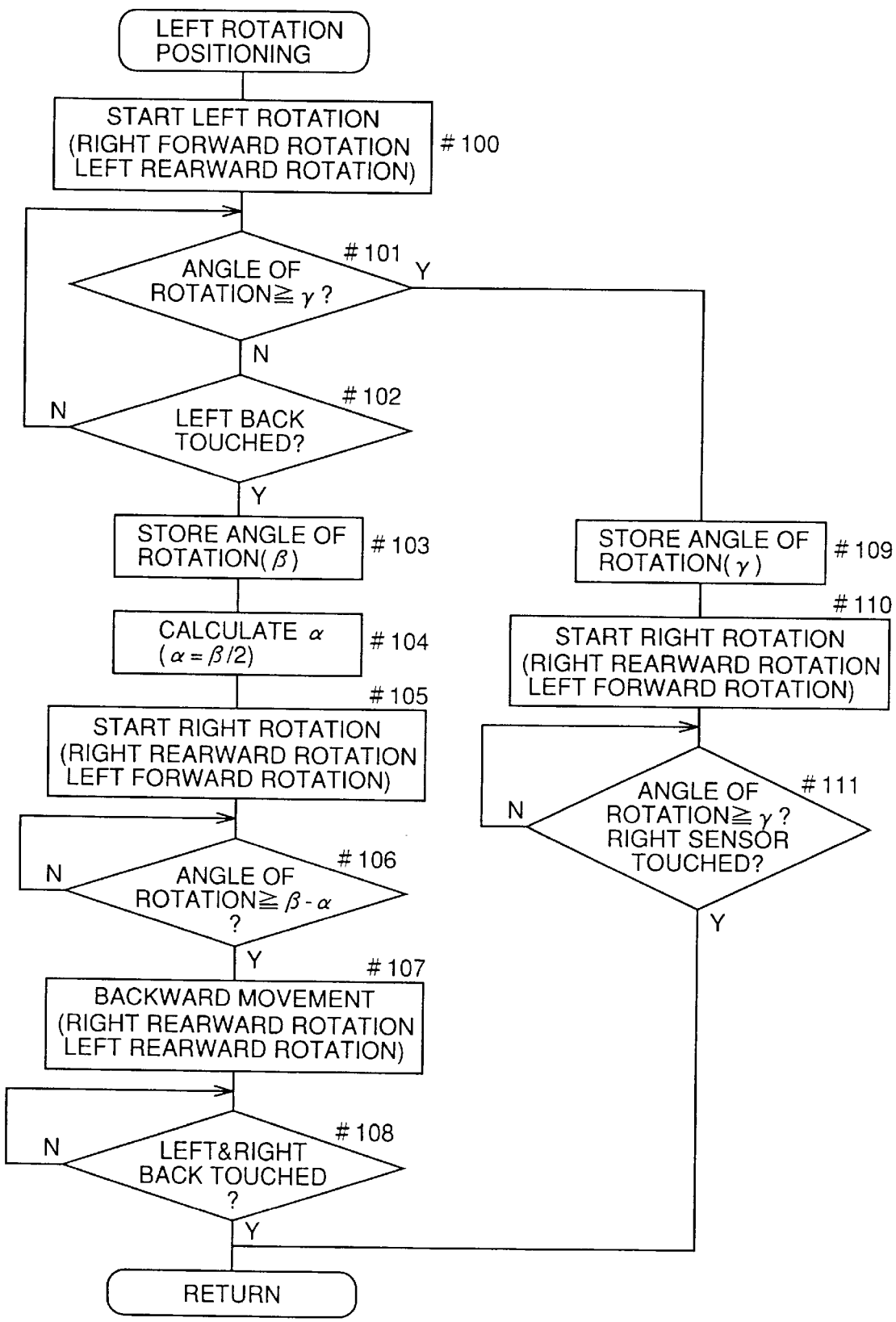
FIG. 11 is a flow chart showing the process in left rotation positioning (#4) of FIG. 10.

FIG. 11 is a flow chart showing the content of the left rotation positioning (#4) of FIG. 10.

Referring to the figure, in step #100, rotation of the running robot to the left is started. For left rotation, right and left driving wheels 301R and 301L are driven such that the right wheel 301R rotates forward and left wheel 301L rotates rearward. In step #101, whether the angle of rotation of the running robot is not smaller than a preset value γ is determined.

The angle θ1 of rotation of the running robot is calculated in accordance with the following equation (1).

$$\theta1 = 360 \cdot x \cdot d1/D1 \qquad (1)$$

Here, x represents the number of rotation of the left or right driving wheel measured by the encoder from the start of rotation, d1 represents diameter of the driving wheel, and D1 represents distance between the left and right driving wheels. Here, rotation is a spin turn, and control is such that the left and right driving wheels rotate at the same number of rotation.

If it is NO in step #101, in step #102, whether a back left portion of the running robot has touched the wall or not is determined. This is determined based on whether one or both microswitches 7f and 7g turned on or not. If it is NO in step #102, the process from step #101 is repeated.

If it is YES in step #102, rotation is stopped, and the angle of rotation of the running robot is stored as β in step #103.

Thereafter, the value β/2 is set to be α in step #104. In step #105, right driving wheel is rotated rearward and left driving wheel is rotated forward, so that right rotation of the running robot starts.

In step #106, whether the angle of rotation of the running robot from the start of right rotation attains β-α or larger is determined, and control waits until the angle is reached (YES). If it is YES in step #106, rotation is stopped and, in step #107, left and right driving wheels are rotated rearward to move the robot backward. In step #108, whether both microswitches 7f and 7e are on is determined, and the control waits until both are turned on (YES). When it is YES in step #108, backward movement is stopped, and the process here is completed.

If it is YES in step #101, rotation is stopped, and the angle of rotation of the running robot is stored as γ in step #109. Thereafter, in step #110, right driving wheel is rotated rearward and the left driving wheel is rotated forward, so as to start right rotation of the running robot. In step #111, whether the angle of rotation of the running robot has reached or exceeded γ, or whether one or both of microswitches 7c and 7e on the right back portion of cleaning unit has turned on is determined, and the flow waits until the answer is YES. When it is YES, rotation is stopped and the process here is completed.

Specific examples of processes shown in FIGS. 10 and 11 will be described.

Figure 12A:
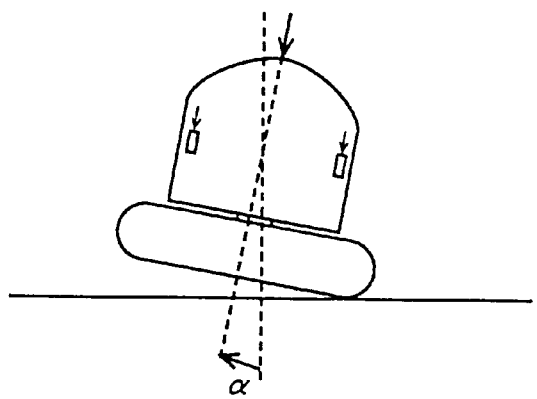
FIGS. 12A to 12D are illustrations showing specific operation in left rotation positioning.

Referring to FIG. 12A, when the running robot moves backward (#1), the right back portion of cleaning unit outer cover 1 touches the wall and microswitch 7c or 7e turns on (YES in #3). The angle between the direction of movement of the running robot at this time and the direction perpendicular to the wall is represented by α.

Figure 12B:
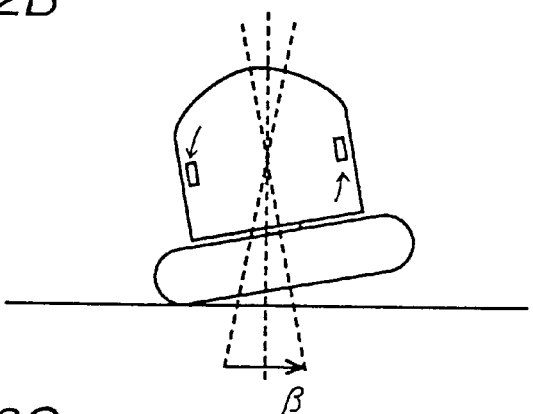
Figure 12C:
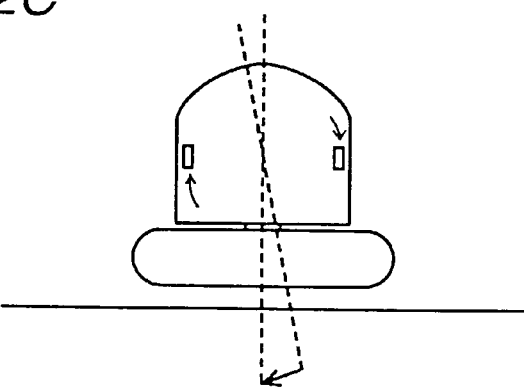
Figure 12D:
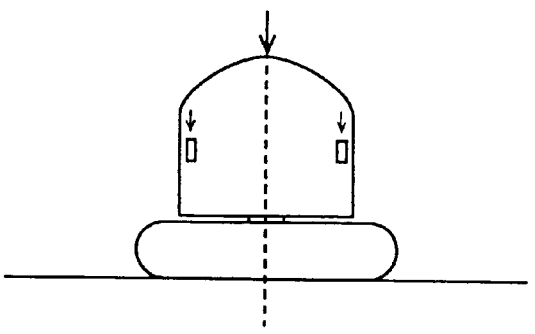

Referring to FIG. 12B, left rotation positioning (#4) is performed, the running robot is rotated to the left until the left back portion of the cleaning unit outer cover touches the wall, and the angle of rotation at this time is represented by β (#102, #103). At this time, based on the angle of rotation β, the angle ax is calculated, and the running robot is rotated to the right by the angle β-α, referring to FIG. 12C (#104 to #106). Thereafter, referring to FIG. 12D, the running robot is moved backward until the left and right back portions of cleaning unit outer cover touch the wall (#107, #108).

In this manner, the direction of movement of the running robot is made perpendicular to the wall, and the running robot is positioned such that the cleaning unit outer cover touches the wall.

Figure 13A:
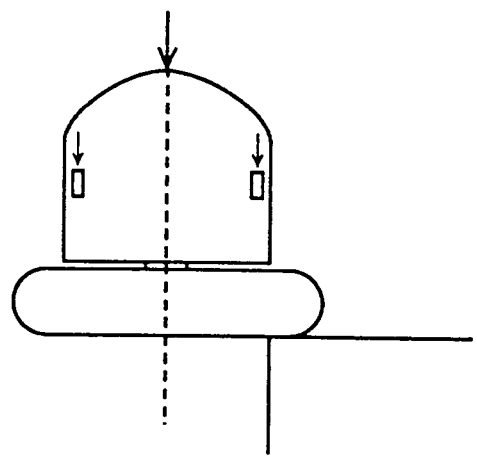
Figure 13B:
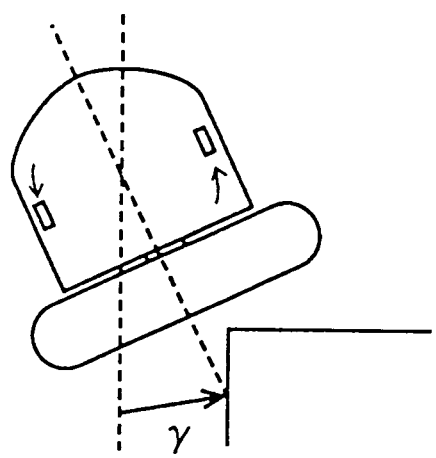
Figure 13C:
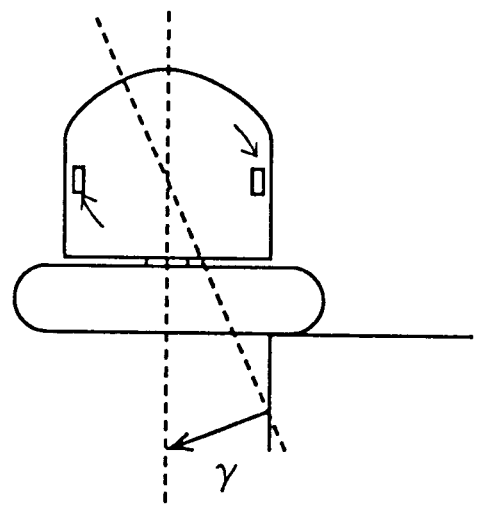

Referring to FIG. 13A, when one of the left and right microswitches turns on in positioning, the running robot starts rotation. When the other microswitch does not turn on even when the angle of rotation reaches or exceeds γ in FIG. 13B (YES in #101), the running robot returns to the state before rotation as shown in FIG. 13C (#109 to #111).

Figure 14:
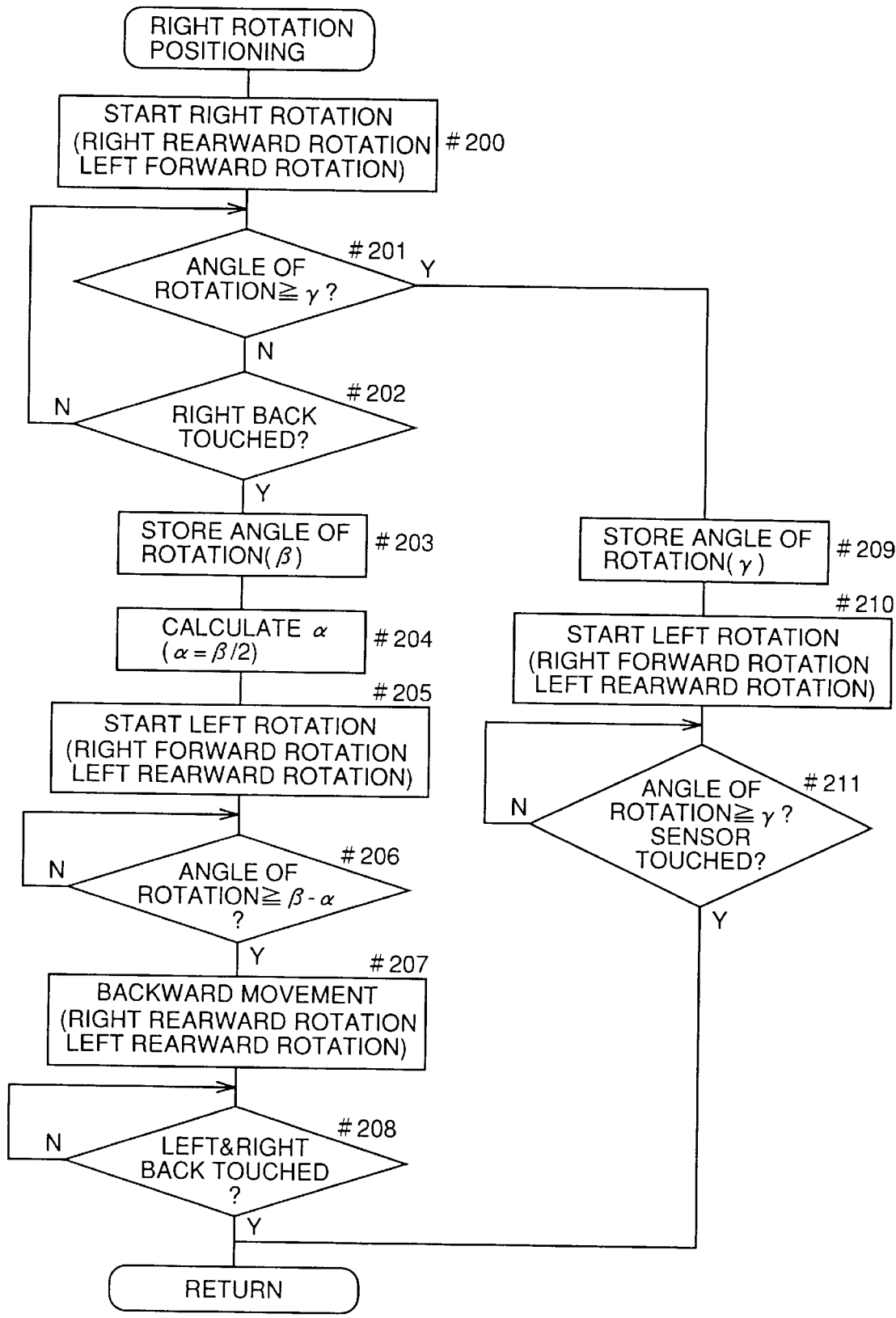
FIG. 14 is a flow chart showing the process in right rotation positioning (#6) of FIG. 10.

FIG. 14 is a flow chart showing the process performed in right rotation positioning (#6) of FIG. 10.

The flow chart is the same as the flow chart of FIG. 11 except that control of left and right driving wheels are reversed. Therefore, description thereof is not repeated. In this process also, the running robot is positioned such that the direction of movement of the running robot is made perpendicular to the wall and the back portion of the cleaning unit outer cover touches the wall, as in the left rotation positioning.

Figure 15A:
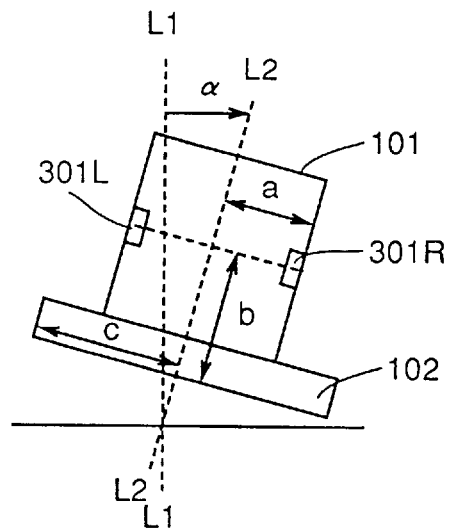
FIGS. 15A to 15C are illustrations showing the left rotation positioning performed by the running robot in accordance with the second embodiment of the present invention.
Figure 15B:
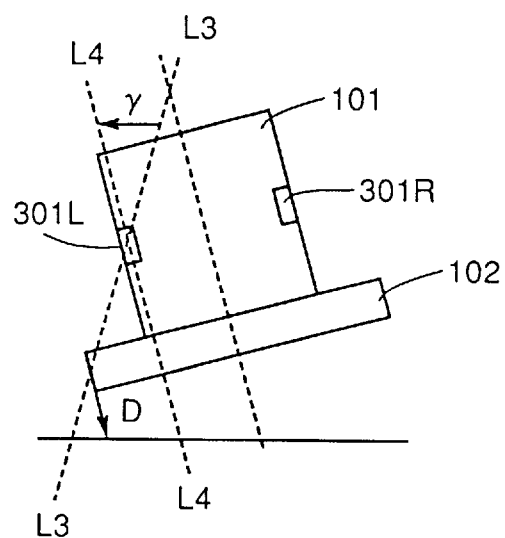
Figure 15C:
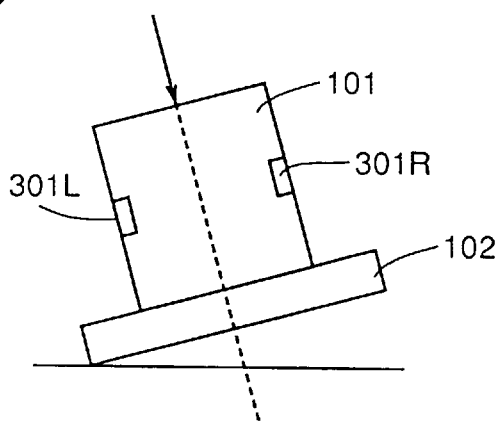

FIGS. 15A to 15C are plan views showing the left rotation positioning of the running robot in accordance with a second embodiment of the present invention.

The structure of the running robot in accordance with the second embodiment is the same as the first embodiment and therefore description thereof is not repeated. In the second embodiment, the process shown in FIG. 14 is performed in left rotation positioning.

Referring to FIG. 15A, when the running robot moves backward and the right side of cleaning unit 102 touches the wall, left rotation positioning is performed. Here, the direction perpendicular to the wall is represented by L1, and center line (direction of movement) of the running robot is represented by L2. The distance from L2 to the side surface of robot body 101 is represented by a, the distance between a line connecting left and right driving wheels 301L and 301R to the rear end of the running robot is represented by b, and the distance from L2 to the side surface of cleaning unit 102 is represented by c. The angle formed by L1 and L2 is represented by α.

In left rotation positioning, the running robot is driven to rotate by the angle γ to the left about the left driving wheel 301L as shown in FIG. 15B. For this driving, left driving wheel 301L is stopped while right driving wheel 301R is rotated forward. In the figure, the line L3 is parallel to L2, and γ is a preset angle.

The running robot moves backward until the left back portion of cleaning unit 102 touches the wall as shown in FIG. 15C. At this time, the distance D of backward movement is determined. There is the relation represented by the following equation (2) between distance D and the angle α.

$$D=(b\cos(\alpha)+(a+c)\sin(\alpha)-b\cos(\alpha+\gamma)-(c-a)\sin(\alpha+\gamma))/\cos(\alpha+\gamma) \quad (2)$$

Figure 16:
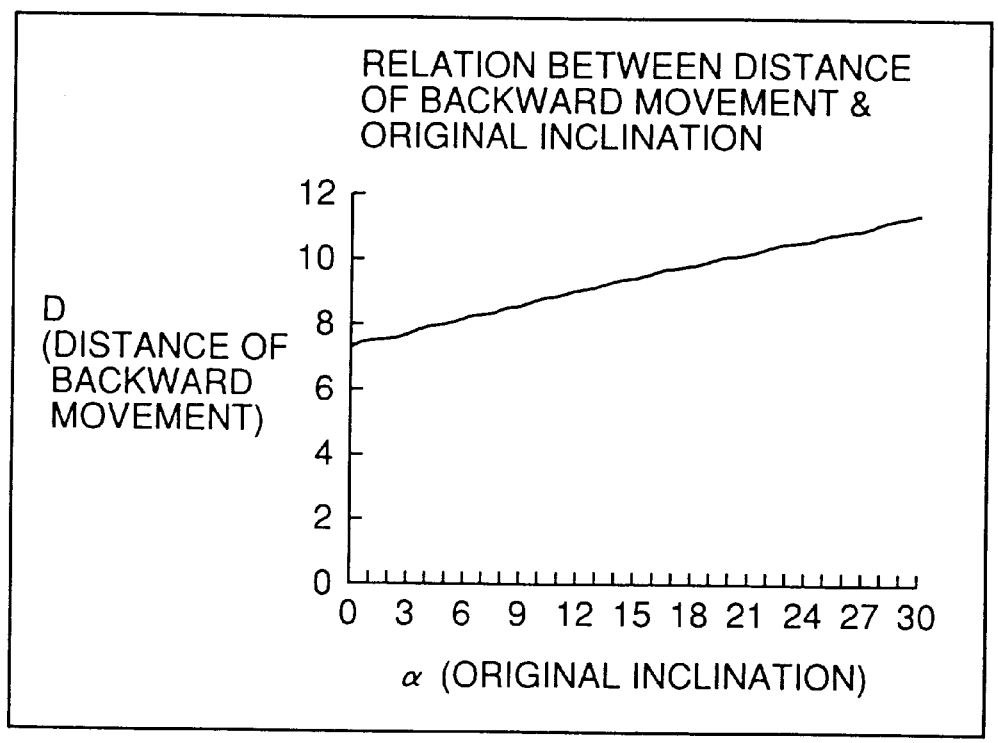
FIG. 16 shows relation between distance of backward movement of the running robot and inclination of the wall.

FIG. 16 is a graph showing the relation between α and D when a=15 cm, b=28 cm, c=20 cm and γ=30°. As can be seen from the graph, when α is within the range of 0 to 30°, the value D increases monotonously. Therefore, the angle α can be calculated if D is determined. The running control unit 10 stores the relation between D and α in the form of a table, calculates the angle α from the value D and performs positioning of the running robot.

The flow of positioning of the running robot in accordance with the second embodiment will be described in the following.

For positioning, first, the process shown in FIG. 10 is performed. Since the process shown in FIG. 10 is the same as that for the first embodiment, description thereof is not repeated. In step #4 of FIG. 10, the process shown in FIG. 17 is performed.

Figure 17:
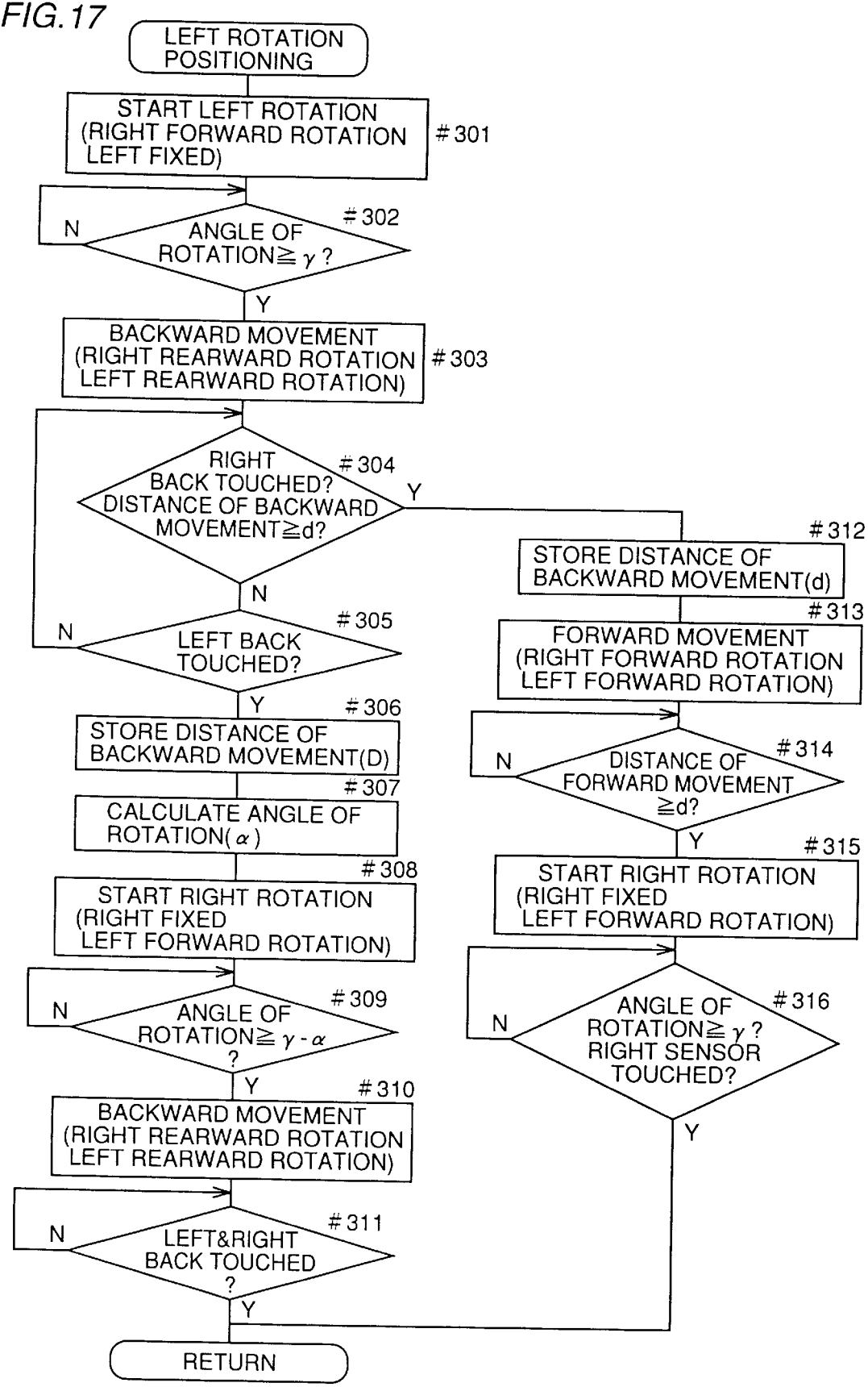
FIG. 17 is a flow chart showing the left rotation positioning process in accordance with the second embodiment.

Referring to FIG. 17, in step #301, the left driving wheel is fixed and right driving wheel is rotated forward, so that left rotation of the running robot starts. In step #302, whether the angle of rotation of the running robot has reached or exceeded γ is determined. The angle θ2 of rotation of the running robot is measured in accordance with the equation (3) based on the number of rotation x of the right driving wheel measured by the encoder.

$$\theta2=360 \cdot x \cdot d1/(2D1) \quad (3)$$

where d1 represents diameter of the driving wheel and D1 represents distance between the left and right driving wheels.

If it is YES in step #302, rotation is stopped, and in step #303, the running robot starts backward movement. For the backward movement, left and right driving wheels move rearward. In step #304, whether the right back portion of the cleaning unit has touched the wall or the like or whether the distance of backward movement has reached or exceeded the upper limit value d is determined. Whether the right back portion of the cleaning unit has touched or not is determined in accordance with whether one or both of microswitches 7c and 7e is turned on.

If it is NO in step #304, whether a left back portion of the cleaning unit has touched the wall or the like determined in step #305. This is determined in accordance with whether one or both of microswitches 7f and 7g is turned on. If it is NO in step #305, the process from step #304 is performed. If it is YES in step #305, backward movement is stopped, and the distance of backward movement of the running robot is stored as D in step #306. The angle α is calculated in accordance with equation (2) in step #307. In step #308, the right driving wheel is stopped and left driving wheel is rotated forward, so that the running robot rotates to the right about the right driving wheel.

In step #309, whether the angle of rotation of the running robot has exceeded γ-α is determined, and the flow waits until the answer is YES. When it is YES, rotation is stopped, and in step #310, the left and right driving wheels are rotated rearward and the running robot moves backward. In step #311, whether the left and right back portions of cleaning unit have touched the wall or not is determined and the flow wait until the answer is YES. When it is YES, backward movement is stopped and the process here is completed.

If it is YES in step #304, backward movement is stopped, and the distance of backward movement of the running robot is stored as d in step #312. In step #313, forward movement of the running robot starts by the forward rotation of left and right driving wheels.

In step #314, whether the distance of forward movement has reached d or longer is determined and the flow waits until the answer becomes YES. If it is YES, forward movement is stopped, the right driving wheel is stopped in step #315 and the left driving wheel is rotated forward, so that the running robot rotates to the right about the right driving wheel.

In step #316, whether the angle of rotation of the running robot has reached γ or larger, or whether microswitches 7c and 7e are on is determined, and the flow waits until the answer becomes YES. When it becomes YES, the process here is completed.

Figure 18:
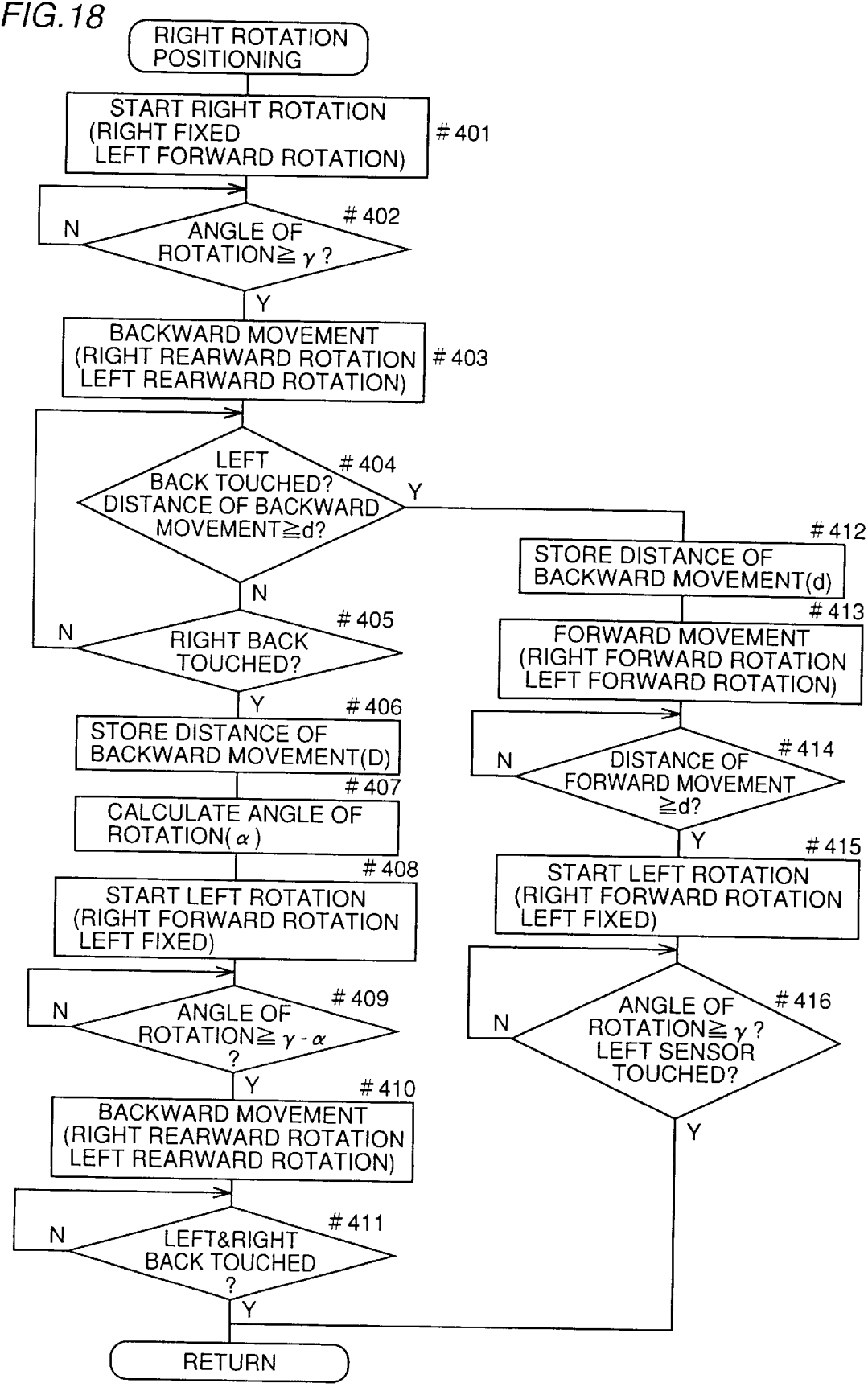
FIG. 18 is a flow chart showing the right rotation positioning process in accordance with the second embodiment.

FIG. 18 is a flow chart showing the right rotation positioning (#6 of FIG. 10) in the second embodiment.

The flow chart is the same as the flow chart of FIG. 17 except that driving of left and right driving wheels is reversed. Therefore, description is not repeated. In the process of the flow chart shown in FIG. 18 also, positioning is performed in the similar manner as in the left rotation positioning.

Figure 19A:
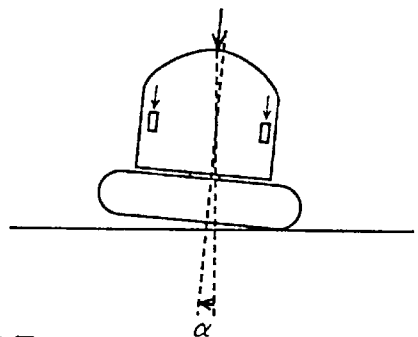
FIGS. 19A to 19E are illustrations showing specific operation of the running robot in the left rotation positioning.

Specific operation in the second embodiment will be described in the following. Referring to FIG. 19A, in positioning process, first, left and right driving wheels are rotated rearward, so that the running robot moves backward (#1). When the right back portion of the cleaning unit 102 touches the wall (YES in #3), left rotation positioning is performed. Here, the angle between the direction perpendicular to the wall and the direction of movement of the running robot is represented by α.

Figure 19B:
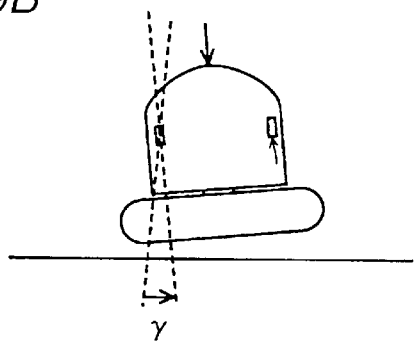
Figure 19C:
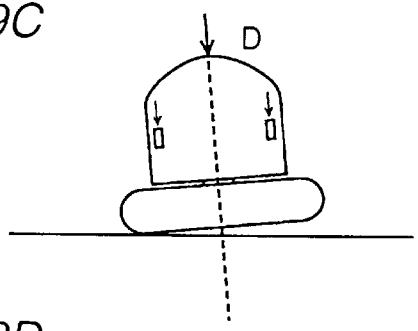
Figure 19D:
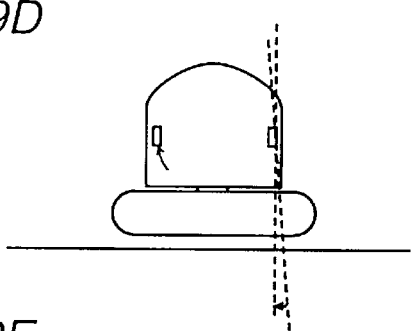

In left rotation positioning, referring to FIG. 19B, the running robot rotates by angle γ to the left, about the left driving wheel (#301, #302). Thereafter, referring to FIG. 19C, the running robot moves backward until the left back portion of the cleaning unit touches the wall (#303 to #306).

Figure 19E:
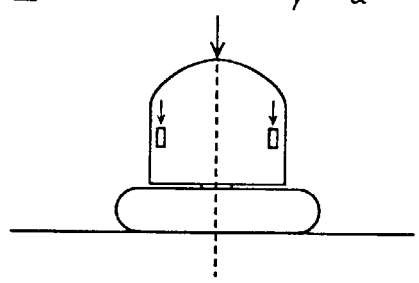

At this time, α is calculated based on the distance D of backward movement, and the running robot rotates by the angle γ-α about the right driving wheel as an axis, as shown in FIG. 9D (#308, #309). Then, as shown in FIG. 19E, the robot moves backward until left and right back portions of the cleaning unit touch the wall (#310, #311).

In this manner, the running robot is positioned such that the direction of movement of the robot is perpendicular to the wall and the back of the cleaning unit touches the wall.

Figure 20A:
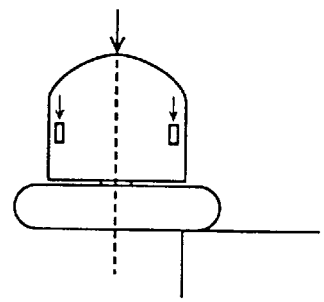
FIGS. 20A to 20E are illustrations showing the operation when cleaning unit does not touch the wall even when the robot moves backward by a prescribed distance d after left turn in the left rotation positioning.
Figure 20B:
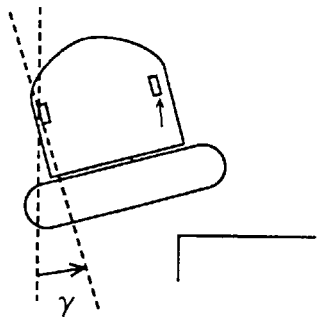
Figure 20C:
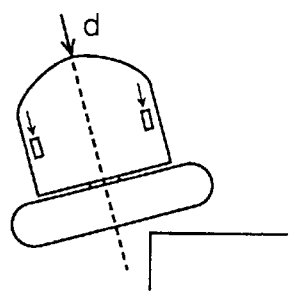
Figure 20D:
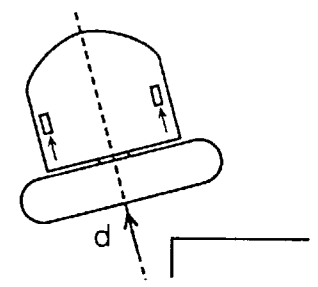
Figure 20E:
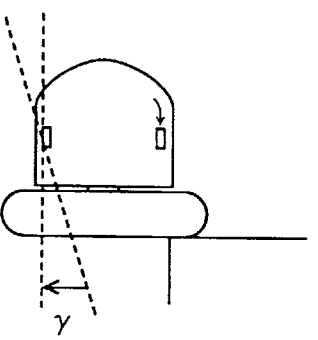

Referring to FIG. 20A, when positioning starts and the right back portion of the cleaning unit of the running robot touches the wall, running robot rotates by the angle γ about the left driving wheel as shown in FIG. 20B, and thereafter the robot moves backward as shown in FIG. 20C. If the left back portion of the cleaning unit does not touch the wall even when the distance of backward movement reaches d, the running robot moves forward by the same distance d as the backward movement as shown in FIG. 20D (#313, #314), and the running robot rotates to the right by the angle γ about the left driving wheel as shown in FIG. 20E (#315, #316). In this manner, the running robot returns to the state before the state of positioning.

Figure 21:
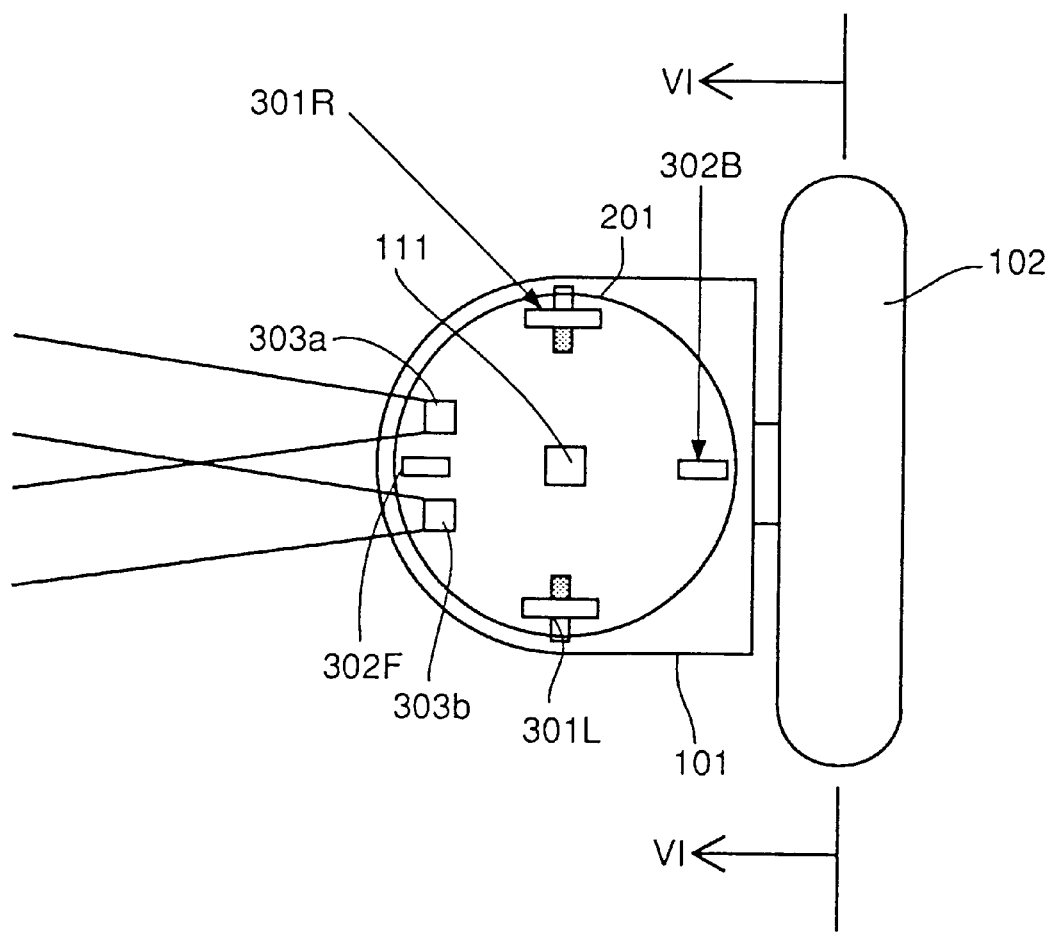
FIG. 21 is a plan view showing a modification of the running robot shown in FIG. 1.
Figure 22:
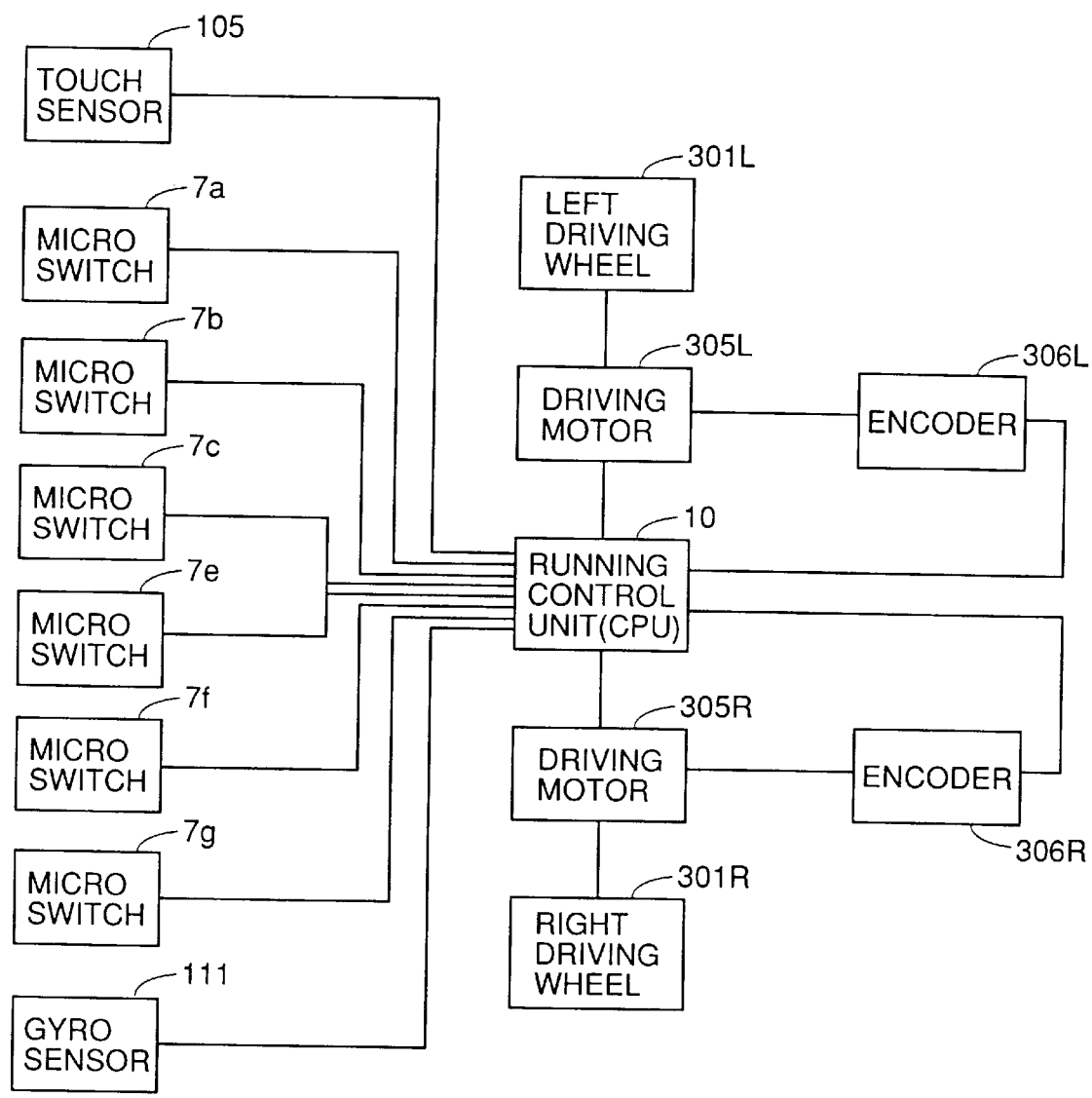
FIG. 22 is a block diagram showing a circuit structure of the running robot shown in FIG. 21.

In the first embodiment, the number of rotation of the driving wheel is measured by an encoder to calculate the angle of rotation of the running robot. However, it may be possible to measure the rotation angle of the running robot directly by providing a gyro sensor, a geomagnetic sensor 111 or the like at the center point of the left and right driving wheels 301R and 301L as shown in FIG. 21. In that case, the circuit structure is as shown in FIG. 22, and the running control unit 10 of the running robot measures the distance of rotation of the running robot based on a signal output from the gyro sensor 111 (or geomagnetic sensor), and performs positioning of the running robot based on the measurement.

In the second embodiment, a process of calculating the angle α of inclination of the direction of movement of the running robot from the normal to the wall has been described. However, the running robot may be driven differently when the angle α is calculated through the steps (1) to (4) below.

(1) The step of finding a direction to which the running robot is directed with respect to the normal to the wall,
(2) the step of turning the moving robot in the direction opposite to the direction found in the step (1) relative to the normal to the wall and away from the wall,
(3) the step of moving backward the running robot and finding the distance until the back portion of the running robot touches the wall again, and
(4) calculating the angle a from the calculated distance.

Figure 23:
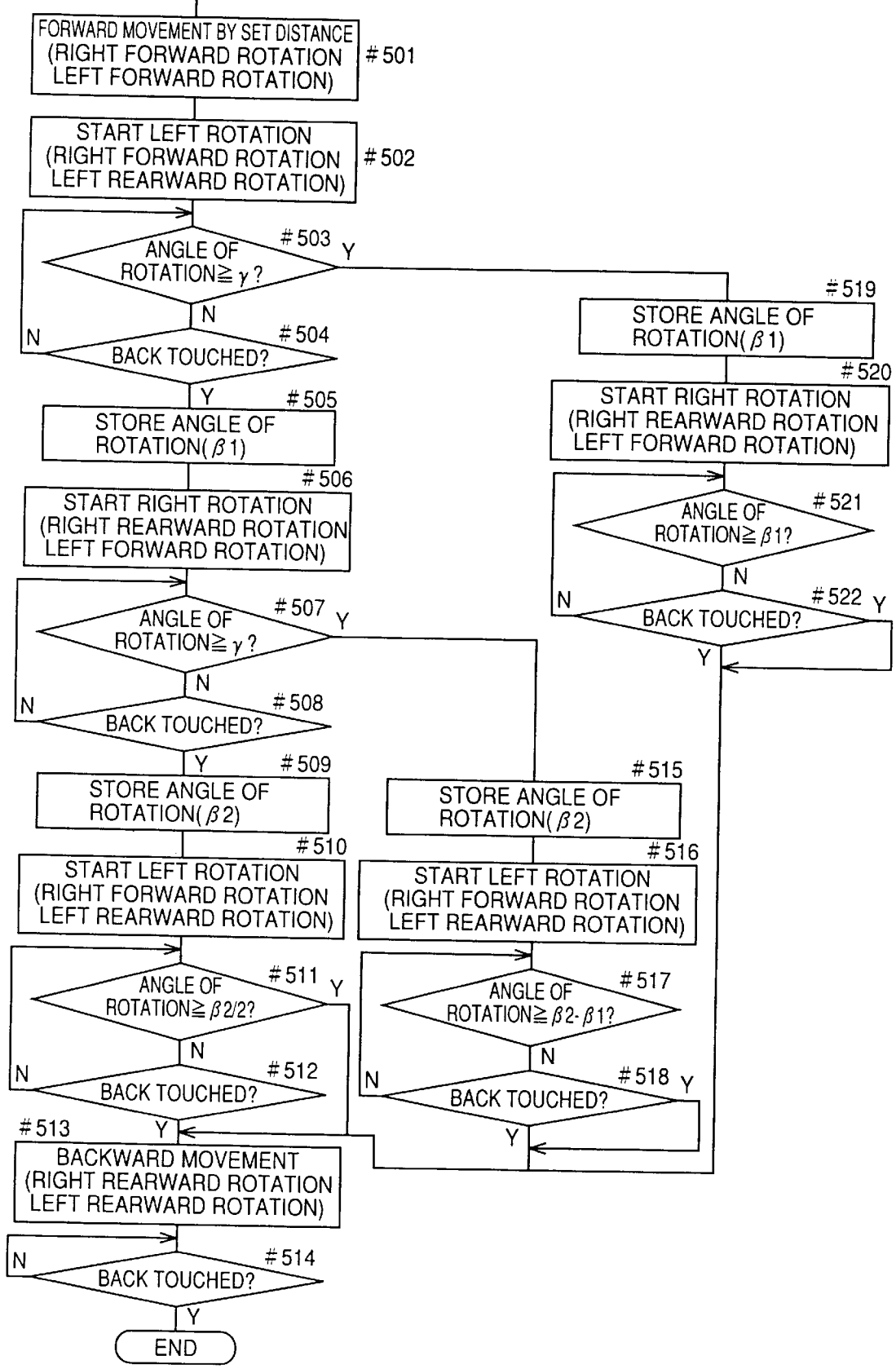
FIG. 23 is a flow chart showing positioning process performed by the running robot in accordance with a third embodiment of the present invention.

FIG. 23 is a flow chart showing the positioning process of the running robot in accordance with the third embodiment of the present invention.

The structure of the running robot in accordance with the third embodiment is the same as that of the first embodiment, and therefore, description thereof is not repeated. In the third embodiment, first, the running robot is moved backward in positioning, touching of an object at any portion of the cleaning unit is detected and, thereafter, the flow chart of FIG. 23 is performed. More specifically, when at least one of the microswitches 7c, 7e, 7f and 7g turns on at the time of backward movement, the process shown in the flow chart of FIG. 23 is performed.

Referring to FIG. 23, in step #501, the robot is moved forward by a distance set in advance. For forward movement, both left and right driving wheels rotate forward. When forward movement by the set distance is completed, forward movement is stopped, and left rotation is started in step #502. For the left rotation, the right driving wheel rotates forward and the left driving wheel rotates rearward.

In step #503, whether the angle of rotation of the running robot after the start of rotation has reached or exceeded the angle γ, which is the maximum angle of rotation, is determined. If it is NO in step #503, in step #504, whether the back of the cleaning unit touched an object or not is determined. If it is NO in step #504, the process from #503 is repeated.

If it is YES in step #504, rotation is stopped, and the angle of rotation is stored as β1 in step #505. Thereafter, in step #506, right rotation of the running robot starts. For the right rotation, right driving wheel rotates rearward, and the left driving wheel rotates forward.

In step #507, whether the angle of rotation of the running robot after the start of right rotation has reached or exceeded γ is determined. If it is NO in step #507, whether the back of the cleaning unit has touched an object or not is determined in #508. If it is NO in step #508, the process from #507 is repeated.

If it is YES in step #508, rotation is stopped, and the angle of rotation is stored as β2 in step #509. Thereafter, in step #510, left rotation of the running robot starts. For left rotation, right driving wheel rotates forward and the left driving wheel rotates rearward.

In step #511, whether the angle of rotation after the start of left rotation has reached or exceeded β2/2 is determined. If it is NO in #511, whether the back of the cleaning unit touched the object or not is determined in step #512.

If it is NO in step #512, the process from step #511 is repeated.

If it is YES in either step #511 or #512, rotation of the running robot is stopped, and the running robot is moved backward in step #513. For backward movement, the left and right driving wheels rotate rearward.

In step #514, whether the back of the cleaning unit has touched an object or not is determined. Backward movement of the running robot is continued until the answer in step #514 becomes YES. When it is YES in step #514, backward movement of the running robot is stopped and the positioning is completed.

If it is YES in step #503, rotation of the running robot is stopped, and the angle of rotation is stored as β1 in step #519. Thereafter, the running robot is rotated to the right in step #520. For right rotation, the right driving wheel rotates rearward and the left driving wheel rotates forward.

In step #521, whether the angle of rotation after the start of right rotation has reached or exceeded β1 is determined. If it is NO in step #521, whether the back of the cleaning unit is touched an object or not is determined in step #522. If it is NO in step #522, the process from #521 is repeated.

If it is YES in either step #521 or #522, rotation of the running robot is stopped, and the process from step #513 is performed.

If it is YES in step #507, rotation of the running robot is stopped, and the angle of rotation of the running robot is stored as β2 in step #515. Thereafter, in step #516, the running robot is rotated to the left. For left rotation, the left driving wheel is rotated rearward and the right driving wheel is rotated forward. In step #517, whether the angle of rotation of the running robot after the start of left rotation has reached or exceeded β2-β1 is determined.

If it is NO in step #517, whether the back of the cleaning unit has touched an object or not is determined in step #518. If it is NO in step #518, the process from step #517 is repeated.

If it is YES in either step #517 or #518, rotation of the running robot is stopped, and the process from step #513 is performed.

Figure 24A:
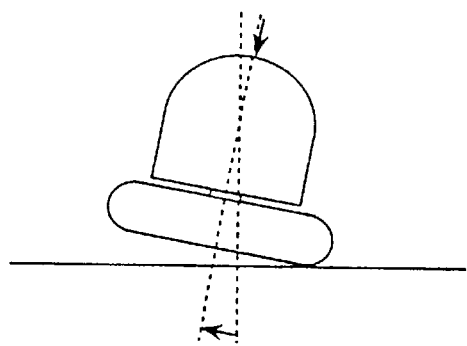
FIGS. 24A to 24F are illustrations showing a first specific example of the process in accordance with the flow chart of FIG. 23.

Specific example of the process in accordance with the flow chart of FIG. 23 will be described. Referring to FIG. 24A, assume that the running robot is inclined by a to the right from the normal to the wall. In positioning, first, the running robot is moved rearward and when the sensor at the back of the cleaning unit touches the wall, the process from the step #501 of FIG. 23 is performed.

Figure 24B:
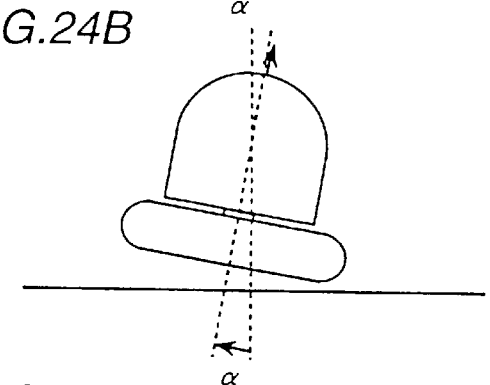
Figure 24C:
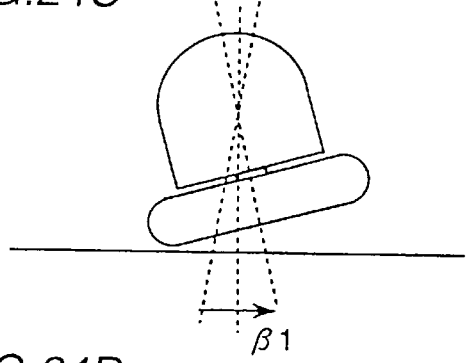
Figure 24D:
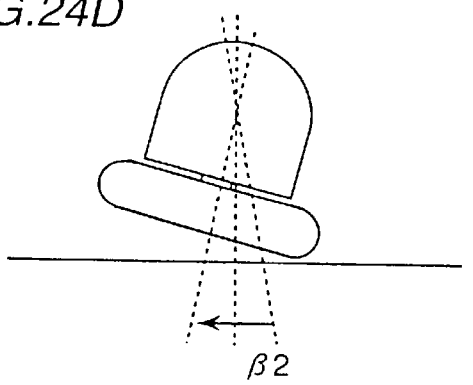

Referring to FIG. 24B, the robot is moved forward by a set distance (#501). Thereafter, referring to FIG. 24C, the running robot is rotated to the left. When it is detected that the back of the cleaning unit has touched the wall during the left rotation (YES in #504), the angle of rotation at that time is stored as β1 (#505). Thereafter, referring to FIG. 24, right rotation of the running robot is performed (#506). At this time, when the back of the cleaning unit touches the wall (YES in #508), the angle of rotation at that time is stored as β2 (#509).

Figure 24E:
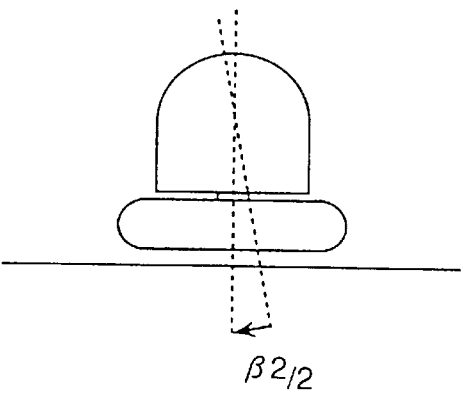
Figure 24F:
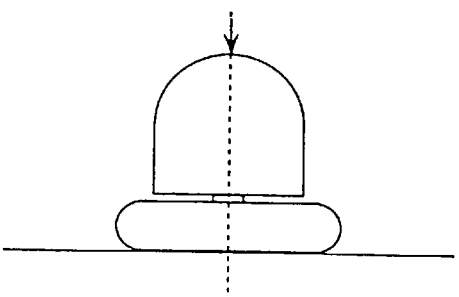
Figure 25A:
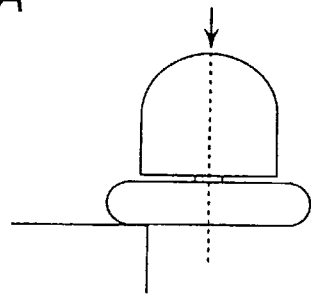
FIGS. 25A to 25E are illustrations showing a second specific example of the process in accordance with the flow chart of FIG. 23.
Figure 25B:
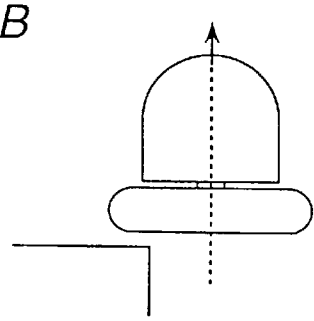
Figure 25C:
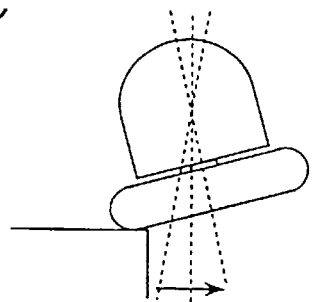
Figure 25D:
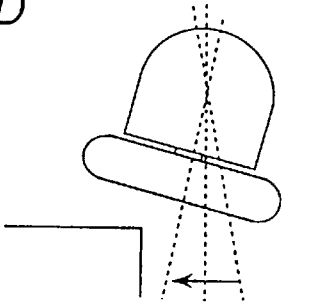
Figure 25E:
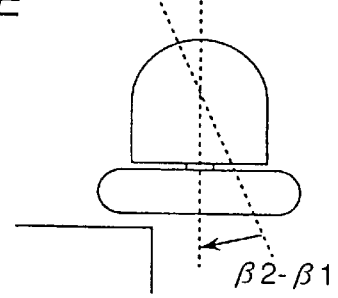

Thereafter, referring to FIG. 24E, the robot is rotated to the left by the angle β2/2 (#510, #511). Thereafter, referring to FIG. 24F, the robot is moved backward until the back of the cleaning unit touches the wall (#513, #514), and positioning is completed.

Thereafter, referring to FIG. 25, assume that the sensor at the back of the cleaning unit touches an object in the left behind the robot. In positioning, first, the robot is moved backward and the sensor at the back of the cleaning unit touches the wall as shown in FIG. 25A. Thereafter, the robot is moved forward by a set distance (#501). Referring to FIG. 25C, the robot is rotated to the left until the sensor at the back of the cleaning unit touches the wall (#502 to #504). The angle of rotation at that time is stored as β1 (#505). Thereafter, referring to FIG. 25D, the running robot is rotated to the right (#506). Here, if the sensor at the back of the cleaning unit does not detect touching with the sensor even when the robot is rotated by the angle γ or more (YES in #502), the angle of rotation at that time is stored as β2 (#515), left rotation of the robot is started (#516) and the robot is rotated by the angle β2−β1 (#516, #517). Thereafter, the running robot is moved backward until the sensor at its back touches the wall (#513, #514). In this manner, the robot is returned to the original position.

Referring to FIG. 26, assume that the back sensor touches an obstacle in the right behind the robot. In positioning, first, the robot is moved backward and when the sensor at the back of the cleaning unit detects touching with the wall as shown in FIG. 26A, the flow chart of FIG. 23 is performed.

Figure 26A:
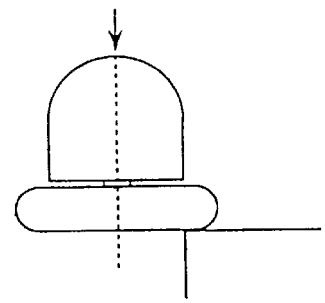
FIGS. 26A to 26E are illustrations showing a third specific example of the process in accordance with the flow chart of FIG. 23.
Figure 26B:
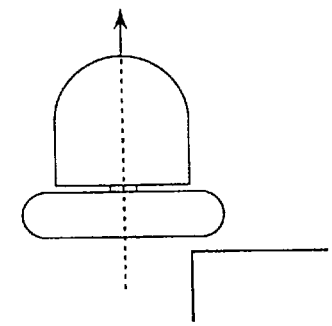
Figure 26C:
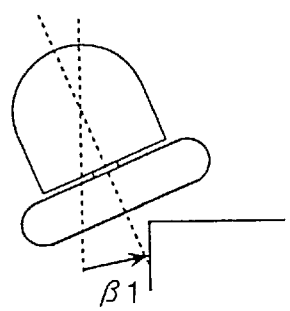
Figure 26D:
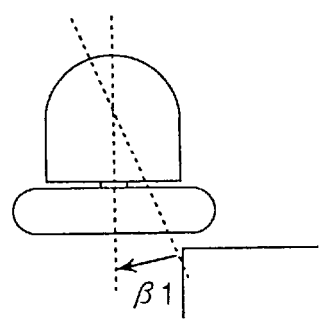
Figure 26E:
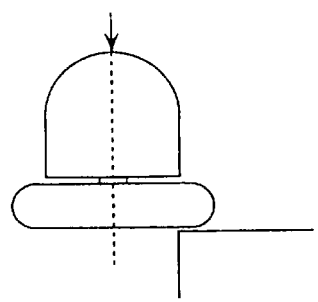

Referring to FIG. 26B, the robot is moved forward by a set amount (#501). Thereafter, referring to FIG. 26C, the running robot is rotated to the left (#502). At this time, if the sensor of the cleaning unit does not detect touching with the wall even after the rotation by the angle γ (YES in #503), the angle of rotation at that time is stored as β1 (#519). Thereafter, referring to FIG. 26D, the robot is rotated to the right by the angle β1 (#520, #521). The robot is moved backward until the back sensor touches the wall as shown in FIG. 26E (#513, #514), and in this manner, the robot is returned to the original position.

In the third embodiment, it is not necessary to set a plurality of microswitches on the left and right of the cleaning unit to determine which of the left and right sides of the cleaning unit touches the object. More specifically, in the third embodiment, the moving body can be positioned simple by detecting whether the cleaning unit touches an object or not. This allows simplification of the apparatus. In other words, touching of the cleaning unit with the wall may be detected by such a structure as shown in FIG. 27, 28 or 29.

Figure 27:
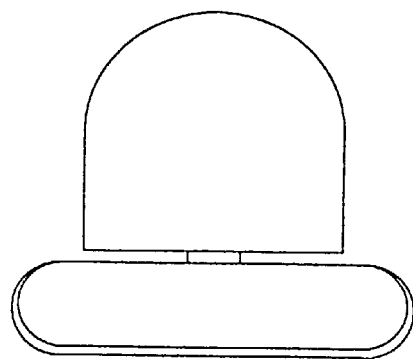
FIGS. 27 to 29 are illustration showing first to third modifications of the sensor at the cleaning unit.

FIG. 27 shows an example in which a rubber sensor is provided around the cleaning unit of the running robot. The rubber sensor refers to an elastic belt provided around the cleaning unit outer cover. When an object touches anywhere of the rubber sensor, a signal is generated, so that it can be detected that an object touched the cleaning unit 102. In the example of FIG. 27, one rubber sensor is provided around the cleaning unit outer cover. Alternatively, the sensor may be divided into a plurality of sensors and the divided sensors may be applied around the cleaning unit outer cover. This enables detection of the position which touched the object, and in addition, it can be applied to the first or second embodiment.

Figure 28:
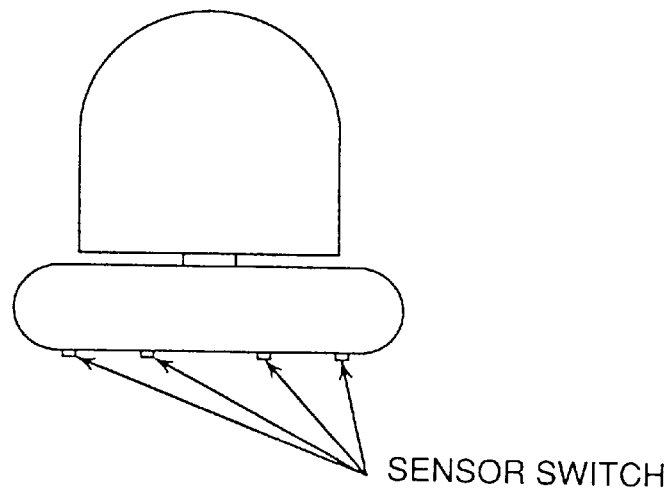

FIG. 28 shows an example in which a sensor switch is provided on a surface of the cleaning unit outer cover. Referring to FIG. 28, the sensor switch is out of the cleaning unit outer cover and it directly detects touching with an object without measuring displacement of the cleaning unit outer cover as shown in FIG. 5. In this example, the larger the number of sensor switches, the higher the preciseness of detection of touching with the object. In this structure also, the position which touches the object can be known, and it may be applied to the first or second embodiment.

Figure 29:
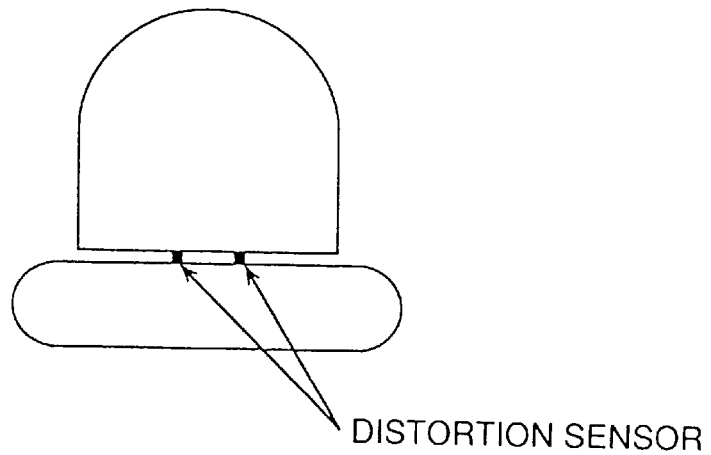

FIG. 29 shows an example in which a distortion sensor is attached to a portion connecting the robot body with the cleaning unit for detecting touching of the cleaning unit with an object. When the cleaning unit touches an object and the portion of the distortion sensor is twisted, a signal is generated. In this manner, touching of the cleaning unit with the object can be detected. In the example of FIG. 29, distortion sensors are provided at the left and right of the connecting portion. However, touching of the cleaning unit with the object can be detected even by one sensor.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An apparatus for positioning a moving body attached on the moving body, comprising:
   a sensor for detecting at which of left and right sides of an end portion of said moving body has touched an object;
   a driver for driving said moving body after detection by said sensor that the end portion of said moving body touched the object at the other one of the left and right sides;
   a measuring device for measuring the amount of driving performed by said driver; and
   a determining unit for determining attitude of said moving body with respect to said object based on said measured amount of driving from the measuring device.

2. The apparatus for positioning a moving body according to claim 1,
   wherein the driver adjusts the attitude of said moving body based on the result of a determination by said determining unit.

3. The apparatus for positioning the moving body according to claim 1, wherein
   said driver includes a pair of driving wheels drivable independent from each other; wherein said driver rotates said pair of driving wheels in mutually opposite directions such that the end portion of said moving body which has touched said object is away from said object after said sensor detects touching.

4. The apparatus for positioning the moving body according to claim 2, wherein
   said driver includes a pair of driving wheels drivable independent from each other; wherein said driver rotates said pair of driving wheels in mutually opposite directions such that the end portion of said moving body which has touched said object is away from said object after said sensor detects touching.

5. The apparatus for positioning a moving body according to claim 1, wherein the driver stops driving said moving body when the amount of driving performed by said driver attains at least a prescribed amount.

6. A method of positioning a movable body which is freely movable and rotatable both in left and right directions, said method comprising the steps of:

detecting contact between said movable body and an object by at least one sensor mounted on said movable body;

moving said movable body away from said object;

rotating said movable body to one of left and right directions until a second contact with the object is detected by said sensor;

rotating said movable body to the other one of said left and right directions until a third contact with the object is detected by said sensor, and measuring the amount of rotation of said movable body at this time; and determining the attitude of said movable body with respect to said object based on said measured amount of rotation.

7. An autonomous running vehicle for autonomously running in a prescribed area having at least one wall surface comprising:

sensors provided juxtaposed to each other on a side of the autonomous running vehicle, for detecting distance to the at least one wall surface;

a driving unit for driving said autonomous running vehicle, whereby said driving unit is rotatable; and a positioning controller for determining the attitude of said autonomous running vehicle with respect to the at least one wall surface by using detection output of the sensors, and for controlling said driving unit to rotate based on the attitude of said autonomous running vehicle when said autonomous running vehicle is positioned near said wall surface.

8. The autonomous running vehicle according to claim 7, wherein said sensor is a touch type sensor for detecting touching with said at least one wall surface.

9. The autonomous running vehicle according to claim 7, wherein said positioning controller positions the attitude of said autonomous running vehicle when said autonomous running vehicle turns near the wall surface.

10. The autonomous running vehicle according to claim 9, wherein said positioning controller positions, after said autonomous running vehicle turns near the wall surface, by moving backward the autonomous running vehicle until it touches the wall surface and thereafter by rotating the running vehicle.

11. The autonomous running vehicle according to claim 7, wherein said autonomous running vehicle is a cleaning vehicle for cleaning a running surface by repeating straight running in a direction perpendicular to said wall surface.

12. The method of positioning a moving body which is freely movable and rotatable both in left and right directions of claim 6, wherein the step of rotating said movable body to one of left and right directions comprises simultaneously rotating two driving devices contained in said movable body in opposite directions; and wherein the step of rotating said movable body to the other one of said left and right directions comprises simultaneously rotating said two driving devices contained in said movable body in opposite directions.

13. The method of positioning a moving body which is freely movable and rotatable both in left and right directions of claim 6, further comprising the step of:

moving said movable body against said object based on the determination of the attitude of said movable body with respect to the object.

14. The method of positioning a moving body which is freely movable and rotatable both in left and right directions of claim 6, further comprising the steps of:

rotating said movable body according to a predetermined relationship using the attitude of said movable body determined in said determining step, whereby said movable body is rotated in the same direction as in the step of rotating said movable body to one of left and right directions; and moving said movable body against said object.

15. A method of positioning a movable body which is freely movable and rotatable both in left and right directions, said method comprising the steps of:

detecting contact between said movable body and an object by at least one sensor mounted on said movable body;

rotating said movable body to one of left and right directions until one of a second contact with the object is detected by said sensor and the attitude of the movable body is at least a predetermined threshold occurs; and rotating said movable body to the other one of said left and right directions until one of a third contact with the object is detected by said sensor and the attitude of the movable body is at least a second predetermined threshold occurs.

16. The method of positioning a moving body which is freely movable and rotatable both in left and right directions of claim 15, wherein the step of rotating said movable body to one of left and right directions comprises simultaneously rotating two driving devices contained in said movable body in opposite directions; and wherein the step of rotating said movable body to the other one of said left and right directions comprises simultaneously rotating said two driving devices contained in said movable body in opposite directions.

17. The method of positioning a moving body which is freely movable and rotatable both in left and right directions of claim 15, wherein the step of rotating said movable body to one of left and right directions comprises rotating only one driving device contained in said movable body; and wherein the step of rotating said movable body to the other one of said left and right directions comprises simultaneously rotating only one driving device contained in said movable body.

18. The method of positioning a moving body which is freely movable and rotatable both in left and right directions of claim 15 further comprising the step of:

moving said movable body against said object after the step of rotating said movable body to the other one of said left and right directions.

19. The method of positioning a moving body which is freely movable and rotatable both in left and right directions of claim 15 further comprising the step of:

moving said movable body until one of the movable body contacts said object and the movable body has moved at least a predetermined distance occurs, wherein said step of moving said movable body is performed after said step of rotating said movable body to one of the left and right directions and before said step of rotating said movable body to the other one of said left and right directions.

20. The method of positioning a moving body which is freely movable and rotatable both in left and right directions of claim 19 further comprising the step of:

moving said movable body against said object after the step of rotating said movable body to the other one of said left and right directions.

* * * * *